(12) United States Patent
Tohyama

(10) Patent No.: US 10,594,918 B2
(45) Date of Patent: Mar. 17, 2020

(54) LIGHTING DEVICE THAT IS CAPABLE OF CONNECTING TO ELECTRONIC APPARATUS, AND CONTROL METHOD THEREFOR

(71) Applicant: CANON KABUSHIKI KAISHA, Tokyo (JP)

(72) Inventor: Kei Tohyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/416,012

(22) Filed: Jan. 26, 2017

(65) Prior Publication Data

US 2017/0134637 A1   May 11, 2017

Related U.S. Application Data

(63) Continuation of application No. 14/978,676, filed on Dec. 22, 2015, now Pat. No. 9,596,363.

(30) Foreign Application Priority Data

Dec. 24, 2014   (JP) .................................. 2014-260285

(51) Int. Cl.
*H04N 5/232* (2006.01)
*H04N 1/00* (2006.01)

(52) U.S. Cl.
CPC .......... *H04N 5/23209* (2013.01); *H04N 1/00* (2013.01); *H04N 5/23203* (2013.01); *H04N 5/23245* (2013.01)

(58) Field of Classification Search
CPC ...................... H04N 5/23209; H04N 5/23245
See application file for complete search history.

(56) References Cited

U.S. PATENT DOCUMENTS 5,761,560 A   6/1998   Miyazawa ..................... 396/532
8,264,597 B2   9/2012   Tohyama ...................... 648/371
(Continued)

FOREIGN PATENT DOCUMENTS

CN          1627174 A      6/2005
CN        101266395 A      9/2008
(Continued)

OTHER PUBLICATIONS

Chinese Office Action issued in corresponding Chinese Application No. 201510983310.4 dated Apr. 10, 2018.

*Primary Examiner* — Twyler L Haskins
*Assistant Examiner* — Fayez Bhuiyan
(74) *Attorney, Agent, or Firm* — Venable LLP

(57) ABSTRACT

An electronic apparatus capable of confirming connection between a body and an accessory without performing communication therebetween. When transmitting first data to the accessory in synchronism with a clock signal and receiving second data from the accessory in synchronism with the clock signal, the body can perform data communication selectively by the first or second communication method. A body microcomputer changes the level of the first data from high level to low, and then further changes the same from low to high in a state where the clock signal is at high in the first communication method. The microcomputer detects a change in level of the second data responsive to the change in level of the first data, and detects accessory connection and compatibility with the second communication method based on detection result.

6 Claims, 18 Drawing Sheets

(56) References Cited

U.S. PATENT DOCUMENTS

| | | | |
|---|---|---|---|
| 2004/0046890 A1 | 3/2004 | Kikuchi | 348/345 |
| 2005/0128829 A1* | 6/2005 | Tohyama | G03B 15/05 |
| | | | 365/200 |
| 2008/0226280 A1 | 9/2008 | Numako | 396/310 |
| 2011/0044682 A1 | 2/2011 | Kawanami | 396/439 |
| 2012/0063020 A1 | 3/2012 | Imafuji | 359/827 |
| 2013/0022348 A1 | 1/2013 | Hasuda | 396/530 |
| 2014/0300768 A1 | 10/2014 | Imamura | |
| 2014/0300808 A1 | 10/2014 | Pan | 348/373 |
| 2016/0227083 A1 | 8/2016 | Imamura | |
| 2017/0052797 A1* | 2/2017 | Shu | G06F 9/44505 |

FOREIGN PATENT DOCUMENTS

| | | |
|---|---|---|
| CN | 102890392 A | 1/2013 |
| CN | 103926782 A | 7/2014 |
| CN | 104040424 A | 9/2014 |
| JP | 02-693030 | 3/1990 |

* cited by examiner

LIGHTING DEVICE THAT IS CAPABLE OF CONNECTING TO ELECTRONIC APPARATUS, AND CONTROL METHOD THEREFOR

CROSS REFERENCE TO RELATED APPLICATION

This application is a continuation of U.S. application Ser. No. 14/978,676, filed on Dec. 22, 2015, the entire disclosure of which is hereby incorporated by reference herein. This application also claims foreign priority under 35 U.S.C. § 119 of Japanese Application No. 2014-260285, filed on Dec. 24, 2014.

BACKGROUND OF THE INVENTION

Field of the Invention

The invention relates to an electronic apparatus, a method of controlling the same, a storage medium, and an accessory device, and more particularly to detection control for detecting connection between an electronic apparatus body and an accessory, and switching control for switching a communication method (communication protocol) of communication between the electronic apparatus body and the accessory.

Description of the Related Art

In general, electronic apparatuses include an image pickup apparatus, such as a digital camera. Conventionally, in the image pickup apparatus, such as the digital camera, when an accessory, such as a strobe device or an interchangeable lens unit, is connected to the body of the image pickup apparatus (hereinafter referred to as the camera body), connection detection is performed for detecting connection of communication terminals of the camera body and the accessory. Then, when the connection is detected, communication is performed between the camera body and the accessory, and if the camera body receives no response from the accessory or there is an anomaly in received data, the camera body determines that the connection is abnormal.

Further, when switching a communication method (i.e. a communication protocol), communication is performed by a communication method before the switching (referred to as the old communication method) to confirm compatibility of the camera body or accessory with a communication method after the switching (referred to as the new communication method), and only after the compatibility is confirmed, the communication method is switched to the new communication method.

For example, there has been proposed a technique in which an interchangeable lens unit is equipped with first to third information transmitting sections, and when the interchangeable lens unit is connected to a camera body, the interchangeable lens unit selects the first information transmitting section or one of the second and third information transmitting sections to perform communication with the camera body (see e.g. Japanese Patent Laid-Open Publication No. H02-693030). In the proposed technique, when transmitting information by the second information transmitting section, if an interchangeable lens unit is equipped with the third information transmitting section, the interchangeable lens unit switches the information transmitting section to one of the second and third information transmitting sections, for communication with the camera body.

However, in the camera described in Japanese Patent Laid-Open Publication No. H02-693030, to confirm connection between the interchangeable lens unit and the camera body, it is necessary to perform determination with respect to the contents of a response sent from the interchangeable lens unit to the camera body after the connection. Therefore, the camera body is required to verify the accuracy of the determination, and further, it takes much time to perform processing for the determination.

Further, when switching the communication method from the old one to the new one, only after performing confirmation of the compatibility with the new one using the old one, the communication method is changed to the new one, so that it takes much time to change the communication method.

SUMMARY OF THE INVENTION

The invention provides an electronic apparatus that is capable of confirming connection between a camera body and an accessory device without performing communication between the camera body and the accessory device, a method of controlling the same, a storage medium, and an accessory device.

Further, the invention provides an electronic apparatus that is capable of switching the communication method from a first communication method to a second communication method without performing communication by the first communication method, a method of controlling the same, and a storage medium.

In a first aspect of the present invention, there is provided an electronic apparatus that includes an electronic apparatus body to which an accessory device can be connected, and performs communication between the electronic apparatus body and the accessory device connected thereto, wherein in a case where the electronic apparatus body transmits first data to the accessory device in synchronism with a clock signal, and receives second data from the accessory device in synchronism with the clock signal, the electronic apparatus body is capable of performing data communication selectively using a first communication method and a second communication method which is different from the first communication method, and in the second communication method, a low level of the second data is different in level from a low level of the clock signal and a low level of the first data in the first communication method, and wherein the electronic apparatus body includes a level changing unit configured to change, in a state in which the clock signal is set to a high level in the first communication method, the first data from a high level to the low level, and then further change the first data from the low level to the high level, and a detection unit configured to detect a change in level of the second data responsive to a change in level of the first data caused by the level changing unit, to thereby detect, based on a result of the detection, whether or not the accessory device is normally connected to the electronic apparatus body, and whether or not the accessory device is compatible with the second communication method.

In a second aspect of the present invention, there is provided a method of controlling an electronic apparatus that includes an electronic apparatus body to which an accessory device can be connected, and performs communication between the electronic apparatus body and the accessory device connected thereto, the method comprising performing, in a case where the electronic apparatus body transmits first data to the accessory device in synchronism with a clock signal and receives second data from the accessory device in synchronism with the clock signal, data communication selectively using a first communication method and a second communication method which is different from the first communication method, and in the second communication method, making a low level of the second data different in level from a low level of the clock signal and a low level of the first data in the first communication method, changing, in a state in which the clock signal is set to the high level in the first communication method, the first data from a high level to the low level, and then further changing the first data from the low level to the high level, and detecting a change in level of the second data responsive to a change in level of the first data caused by said changing in level, to thereby detect, based on a result of the detection, whether or not the accessory device is normally connected to the electronic apparatus body, and whether or not the accessory device is compatible with the second communication method.

In a third aspect of the present invention, there is provided a non-transitory computer-readable storage medium storing a computer-executable program for executing a method of controlling an electronic apparatus that includes an electronic apparatus body to which an accessory device can be connected, and performs communication between the electronic apparatus body and the accessory device connected thereto, wherein the method comprises performing, in a case where the electronic apparatus body transmits first data to the accessory device in synchronism with a clock signal and receives second data from the accessory device in synchronism with the clock signal, data communication selectively using a first communication method and a second communication method which is different from the first communication method, and in the second communication method, making a low level of the second data different in level from a low level of the clock signal and a low level of the first data in the first communication method, changing, in a state in which the clock signal is set to the high level in the first communication method, the first data from a high level to the low level, and then further changing the first data from the low level to the high level, and detecting a change in level of the second data responsive to a change in level of the first data caused by said changing in level, to thereby detect, based on a result of the detection, whether or not the accessory device is normally connected to the electronic apparatus body, and whether or not the accessory device is compatible with the second communication method.

In a fourth aspect of the present invention, there is provided an accessory device that is capable of connecting to an electronic apparatus, and performs communication between the accessory device and the electronic apparatus connected thereto, wherein in a case where the electronic apparatus transmits first data to the accessory device in synchronism with a clock signal, and receives second data from the accessory device in synchronism with the clock signal, the electronic apparatus is capable of performing data communication selectively using a first communication method and a second communication method which is different from the first communication method, and in the second communication method, a low level of the second data is different in level from a low level of the clock signal and a low level of the first data in the first communication method, and wherein the accessory device includes a notification unit configured to change, in a case where, in a state in which the clock signal is at a high level in the first communication method, the first data is changed from a high level to the low level and is further changed from the low level to the high level in the first communication method, the second data from the low level to a high level in the second communication method to thereby notify the electronic apparatus that the accessory device is normally connected to the electronic apparatus, and also the accessory device is compatible with the second communication method.

According to the invention, it is possible to perform connection confirmation and switching to the second communication method in a manner preventing adverse influence from being exerted on an accessory device which is compatible only with the first communication method. Further, it is possible to switch to the second communication method in a short time period without performing communication by the first communication method.

Further features of the present invention will become apparent from the following description of exemplary embodiments (with reference to the attached drawings).

BRIEF DESCRIPTION OF THE DRAWINGS

FIGS. 2A to 2C are diagrams useful in explaining a communication interface section provided in a camera body appearing in FIG. 1, in which FIG. 2A shows an interface circuit thereof for a clock signal delivered from the camera body to the accessory, FIG. 2B shows an interface circuit thereof for communication data output from the camera body to the accessory, and FIG. 2C shows an interface circuit thereof for communication data input from the accessory to the camera body.

FIGS. 3A to 3C are diagrams useful in explaining a communication interface section provided in the accessory appearing in FIG. 1, in which FIG. 3A shows an interface circuit thereof for the clock signal delivered from the camera body to the accessory, FIG. 3B shows an interface circuit thereof for the communication data output from the camera body to the accessory, and FIG. 3C shows an interface circuit thereof for the communication data input from the accessory to the camera body.

FIGS. 4A to 4C are diagrams useful in explaining a case where the communication interface section of the accessory appearing in FIG. 1 are formed by interface circuits compatible only with a first communication method, in which FIG. 4A shows an interface circuit thereof for the clock signal delivered from the camera body to the accessory, FIG. 4B shows an interface circuit thereof for the communication data output from the camera body to the accessory, and FIG. 4C shows an interface circuit thereof for the communication data input from the accessory to the camera body.

FIGS. 15A and 15B are diagrams useful in explaining a communication interface section provided in the accessory appearing in FIG. 13, in which FIG. 15A shows an interface circuit thereof for a clock signal delivered from the camera body to the accessory, and FIG. 15B shows an interface circuit thereof for communication data output from the camera body to the accessory.

DESCRIPTION OF THE EMBODIMENTS

The invention will now be described in detail below with reference to the accompanying drawings showing embodiments thereof. In the embodiments, a digital camera (hereafter simply referred to as "the camera") is taken as an example of an electronic apparatus, and an accessory, such as a lighting device, is connected to a camera body of the camera.

Figure 1:
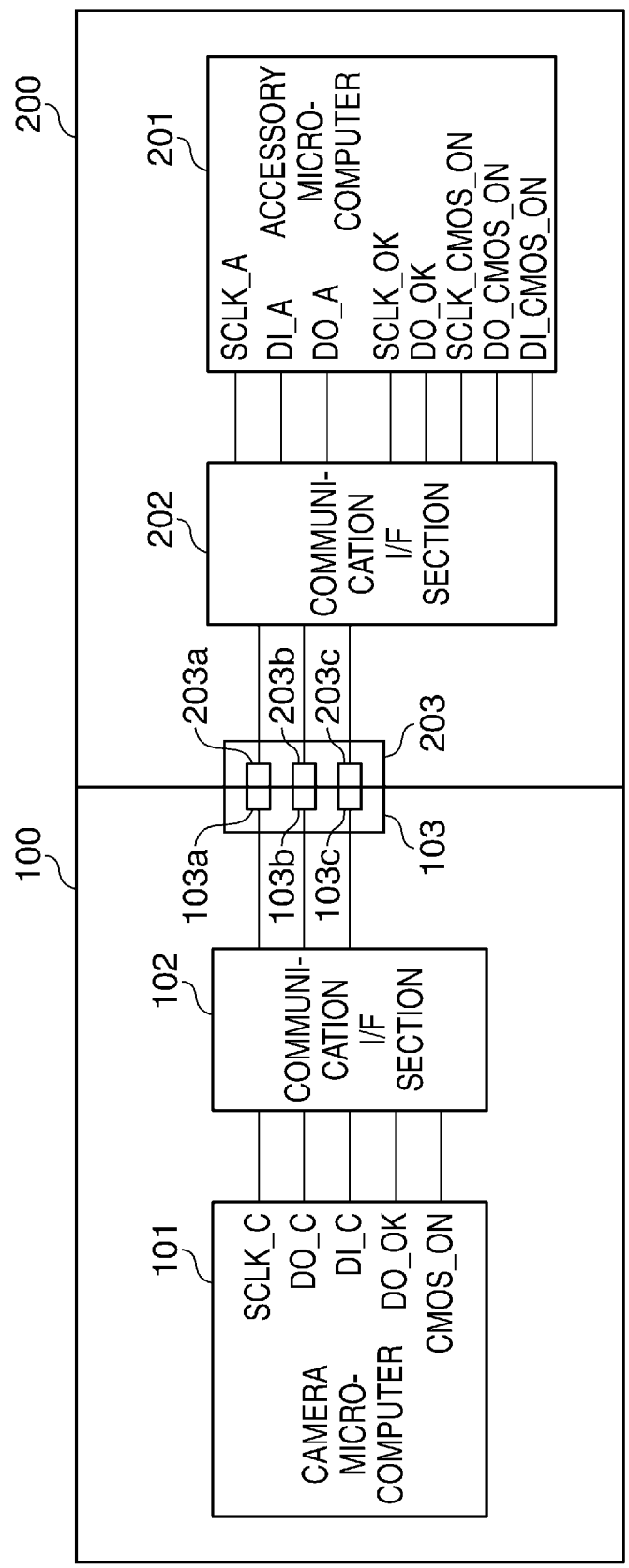
FIG. 1 is a block diagram showing a camera as an electronic apparatus according to a first embodiment of the invention together with an accessory.

FIG. 1 is a block diagram showing the camera as the electronic apparatus according to a first embodiment of the invention together with the accessory.

In the camera shown in FIG. 1, the accessory, denoted by reference numeral 200, such as a lighting device (strobe device), is connected to the camera body, denoted by reference numeral 100. The camera body 100 is provided with a microcomputer (hereinafter referred to as the camera microcomputer) 101, and the camera microcomputer 101 controls the camera body and performs communication (data communication) with the accessory 200.

A communication interface (I/F) section 102 is used for connecting the camera microcomputer 101 and an accessory microcomputer 201 provided in the accessory 200, and is compatible with a first communication method and a second communication method, described hereinafter. The camera body 100 is connected to the accessory 200 via a communication contact section 103.

The communication contact section 103 includes a clock (SCLK) terminal 103a, a data output (DO) terminal 103b, and a data input (DI) terminal 103c. The SCLK terminal 103a is a terminal for outputting a clock signal from the camera body 100 to the accessory 200. The DO terminal 103b is a terminal for outputting communication data from the camera body 100 to the accessory 200 in synchronism with the clock signal. Further, the DI terminal 103c is a terminal for inputting communication data from the accessory 200 to the camera body 100 in synchronism with the clock signal.

The accessory microcomputer 201 of the accessory 200 controls the overall operation of the accessory 200 and communicates with the camera microcomputer 101. A communication interface (I/F) section 202 is used for connecting the camera microcomputer 101 and the accessory microcomputer 201, and is compatible with the first and second communication methods. The accessory 200 is connected to the camera body 100 via a communication contact section 203.

The communication contact section 203 includes a clock (SCLK) terminal 203a, a data output (DO) terminal 203b, and a data input (DI) terminal 203c. The SCLK terminal 203a, the DO terminal 203b, and the DI terminal 203c are connected to the SCLK terminal 103a, the DO terminal 103b, and the DI terminal 103c, respectively.

Figure 2A:
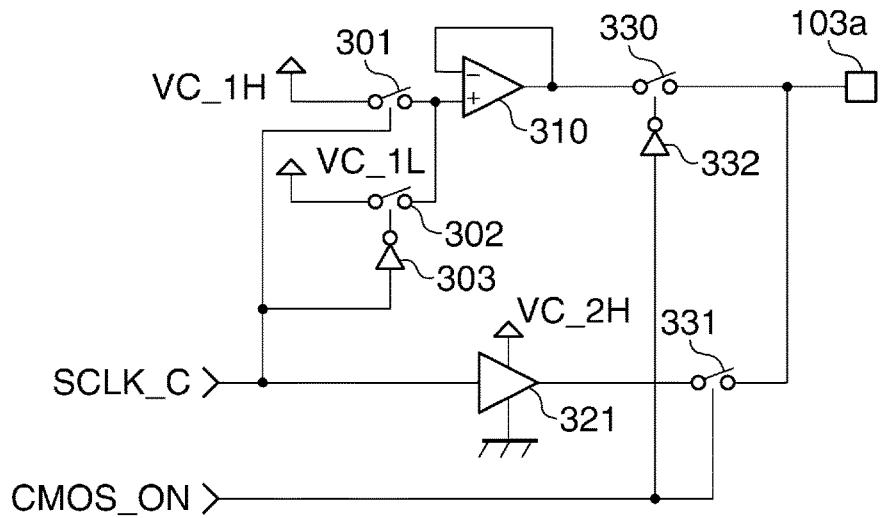
Figure 2B:
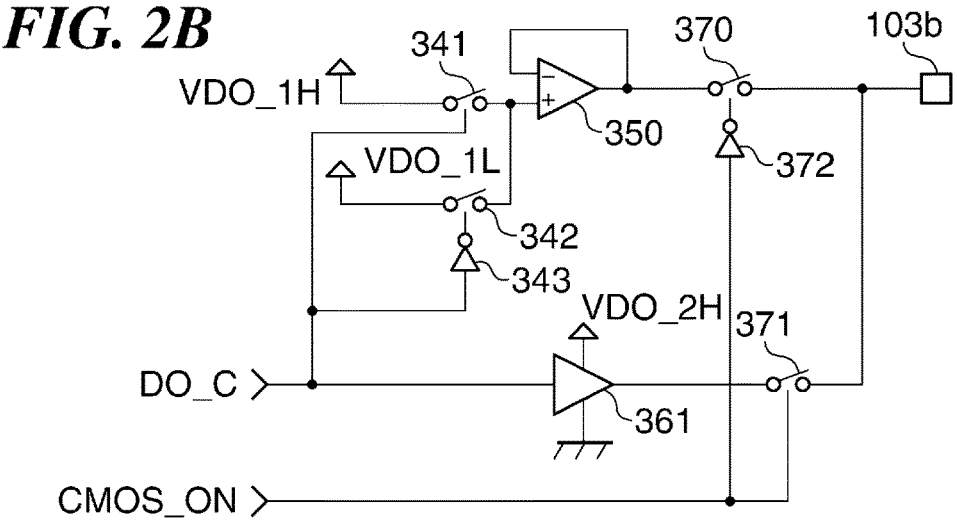
Figure 2C:
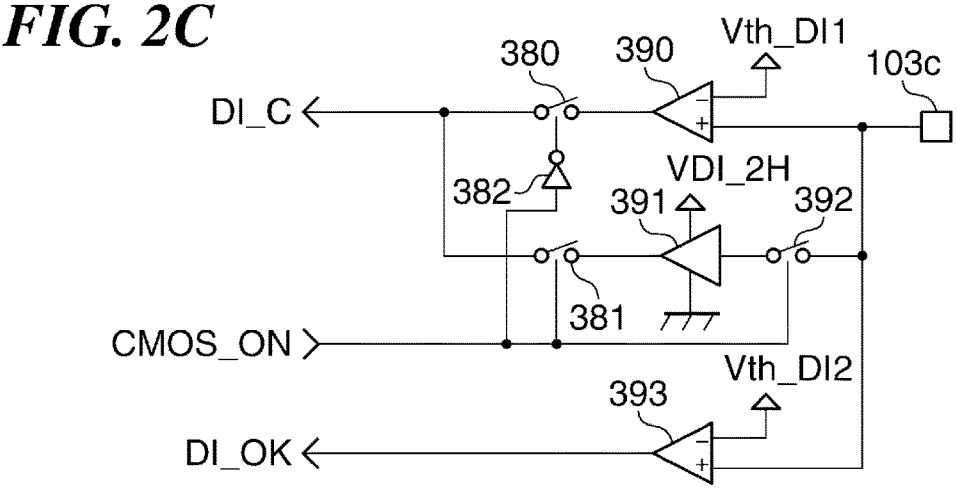

FIGS. 2A to 2C are diagrams useful in explaining the communication interface section 102 provided in the camera body 100 appearing in FIG. 1, in which FIG. 2A shows an interface circuit thereof for the clock signal delivered from the camera body 100 to the accessory 200, FIG. 2B shows an interface circuit thereof for the communication data output from the camera body 100 to the accessory 200, and FIG. 2C shows an interface circuit thereof for the communication data input from the accessory 200 to the camera body 100.

First, referring to FIG. 2A, a communication clock terminal SCLK_C of the camera microcomputer 101 is connected to a control terminal of an analog switch 301, and is connected to a control terminal of an analog switch 302 via an inverter 303. The analog switch 301 has one end to which a high-level voltage (VC_1H) of the SCLK terminal 103a is applied, and the other end connected to a non-inverted input terminal of an operational amplifier 310. Note that the voltage VC_1H of the SCLK terminal 103a is a high-level voltage compatible with the first communication method.

The analog switch 302 has one end to which a low-level voltage (VC_1L) of the SCLK terminal 103a is applied, and the other end connected to the non-inverted input terminal of the operational amplifier 310. Note that the voltage VC_1L of the SCLK terminal 103a is a low-level voltage compatible with the first communication method.

The operational amplifier 310 has an output terminal connected to an inverted input terminal thereof, and when the voltage of the communication clock terminal SCLK_C of the camera microcomputer 101 is at a high level, the operation amplifier 310 outputs the voltage VC_1H of the SCLK terminal 103a, which is compatible with the first communication method. On the other hand, when the voltage of the communication clock terminal SCLK_C of the camera microcomputer 101 is at a low level, the operation amplifier 310 outputs the voltage VC_1L of the SCLK terminal 103a, which is compatible with the first communication method. Further, the output terminal of the operational amplifier 310 is connected to one end of an analog switch 330.

The communication clock terminal SCLK_C of the camera microcomputer 101 is connected to an input terminal of a CMOS output buffer 321, and the CMOS output buffer 321 selectively outputs a high-level voltage (VC_2H) and a low-level voltage (VC_2L=0 V), which are compatible with the second communication method. Further, an output terminal of the CMOS output buffer 321 is connected to one end of an analog switch 331.

The analog switch 330 has the other end connected to the SCLK terminal 103a which is a communication contact between the camera body 100 and the accessory 200, and a control terminal connected to a communication method-switching signal terminal (CMOS_ON terminal) of the camera microcomputer 101 via an inverter 332. The analog switch 331 has the other end connected to the SCLK terminal 103a, and a control terminal connected to the CMOS_ON terminal of the camera microcomputer 101.

Now, assuming that the camera microcomputer 101 sets the voltage of the CMOS_ON terminal to a low level, the analog switch 330 is turned on to connect the output terminal of the operational amplifier 310 to the SCLK terminal 103a. That is, the voltage VC_1H or VC_1L compatible with the first communication method is output to the SCLK terminal 103a.

On the other hand, assuming that the camera microcomputer 101 sets the voltage of the CMOS_ON terminal to a high level, the analog switch 331 is turned on to connect the output terminal of the CMOS output buffer 321 to the SCLK terminal 103a. That is, the voltage VC_2H or VC_2L compatible with the second communication method is output to the SCLK terminal 103a.

Next, referring to FIG. 2B, a data output terminal DO_C of the camera microcomputer 101 is connected to a control terminal of an analog switch 341, and is connected to a control terminal of an analog switch 342 via an inverter 343. The analog switch 341 has one end to which a high-level voltage (VDO_1H) of the DO terminal 103b is applied, and the other end connected to a non-inverted input terminal of an operational amplifier 350. Note that the voltage VDO_1H of the DO terminal 103b is a high-level voltage compatible with the first communication method.

The analog switch 342 has one end to which a low-level voltage (VDO_1L) of the DO terminal 103b is applied, and the other end connected to the non-inverted input terminal of the operational amplifier 350. Note that the voltage VDO_1L of the DO terminal 103b is a low-level voltage compatible with the first communication method.

The operational amplifier 350 has an output terminal connected to an inverted input terminal thereof, and when the voltage of the data output terminal DO_C of the camera microcomputer 101 is at a high level, the operational amplifier 350 outputs the voltage VDO_1H of the DO terminal 103b, which is compatible with the first communication method. On the other hand, when the voltage of the data output terminal DO_C of the camera microcomputer 101 is at a low level, the operational amplifier 350 outputs the voltage VDO_1L of the DO terminal 103b, which is compatible with the first communication method. Further, the output terminal of the operational amplifier 350 is connected to one end of an analog switch 370.

The data output terminal DO_C of the camera microcomputer 101 is connected to an input terminal of a CMOS output buffer 361, and the CMOS output buffer 361 selectively outputs a high-level voltage (VDO_2H) and a low-level voltage (VDO_2L=0 V), which are compatible with the second communication method. Further, an output terminal of the CMOS output buffer 361 is connected to one end of an analog switch 371.

The analog switch 370 has the other end connected to the DO terminal 103b which is a communication contact between the camera body 100 and the accessory 200, and a control terminal connected to the communication method-switching signal terminal (CMOS_ON terminal) of the camera microcomputer 101 via an inverter 372. The analog switch 371 has the other end connected to the DO terminal 103b, and a control terminal connected to the CMOS_ON terminal of the camera microcomputer 101.

Assuming that the camera microcomputer 101 sets the voltage of the CMOS_ON terminal to the low level, the analog switch 370 is turned on to connect the output terminal of the operational amplifier 350 to the DO terminal 103b. That is, the voltage VDO_1H or VDO_1L compatible with the first communication method is output to the DO terminal 103b.

On the other hand, assuming that the camera microcomputer 101 sets the voltage of the CMOS_ON terminal to the high level, the analog switch 371 is turned on to connect the output terminal of the CMOS output buffer 361 to the DO terminal 103b. That is, the voltage VDO_2H or VDO_2L compatible with the second communication method is output to the DO terminal 103b.

Next, referring to FIG. 2C, the DI terminal 103c which is a communication contact between the camera body 100 and the accessory 200 is connected to a non-inverted input terminal of a comparator 390, and is also connected to an input terminal of a buffer 391 via an analog switch 392. Further, the DI terminal 103c is connected to a non-inverted input terminal of a comparator 393.

The comparator 390 has an inverted input terminal to which is applied a determination threshold voltage Vth_DI1 for determining whether the voltage of the DI terminal 103c is a high-level voltage (VDI_1H) or low-level voltage (VDI_1L) compatible with the first communication method. Note that in the present example, VDI_1L<Vth_DI1<VDI_1H holds. Further, the comparator 390 has an output terminal connected to a serial data input terminal DI_C of the camera microcomputer 101 via an analog switch 380.

The buffer 391 is a CMOS buffer in which the power supply voltage is the high-level voltage (VDI_2H) of the DI terminal 103c, which is compatible with the second communication method, and the output of the buffer 391 is connected to the serial data input terminal DI_C of the camera microcomputer 101 via an analog switch 381.

The analog switch 380 has a control terminal connected to the communication method-switching signal terminal (CMOS_ON terminal) of the camera microcomputer 101 via an inverter 382. Further, control terminals of the analog switches 381 and 392 are connected to the CMOS_ON terminal of the camera microcomputer 101.

The comparator 393 has a non-inverted input terminal to which is applied a connection confirmation voltage Vth_DI2 for confirming connection of the DI terminal 103c. Note that in the present example, 0 V<Vth_DI2<VDI_1L holds. Further, the connection confirmation voltage Vth_DI2 may be set to a determination threshold voltage for determining whether the voltage is the high-level voltage or the low-level voltage in the second communication method. Further, the comparator 393 has an output terminal connected to a connection confirmation determination port (DI_OK) of the camera microcomputer 101.

With this configuration, when the camera microcomputer 101 sets the voltage of the CMOS_ON terminal to the low level, the output from and input to the communication contact section 103 can be set to those in the first communication method. Further, when the camera microcomputer 101 sets the voltage of the CMOS_ON terminal to the high level, the output from and input to the communication contact section 103 can be set to those in the second communication method.

Figure 3A:
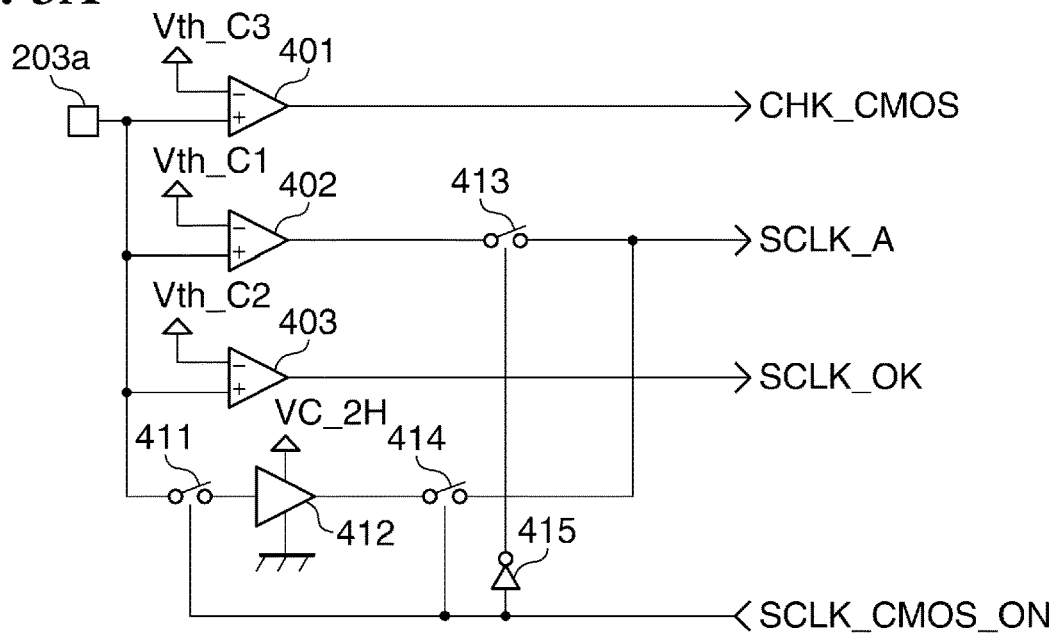
Figure 3B:
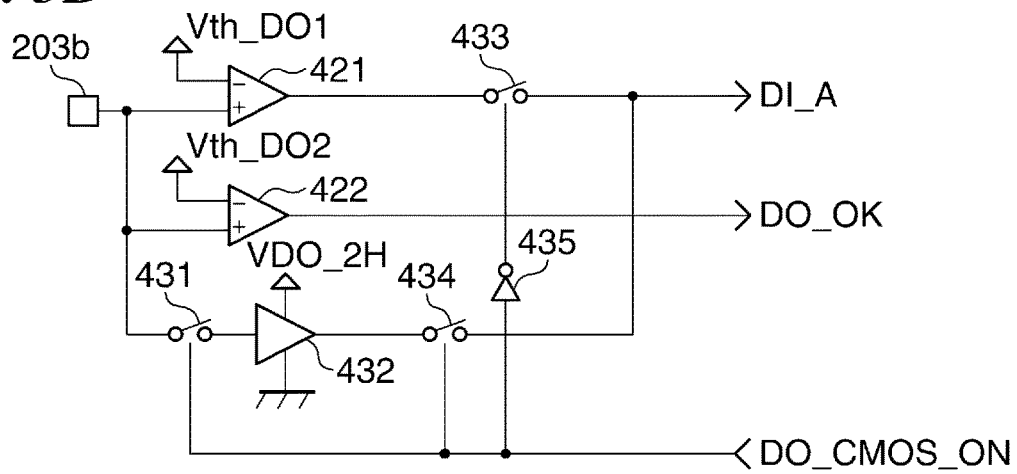
Figure 3C:
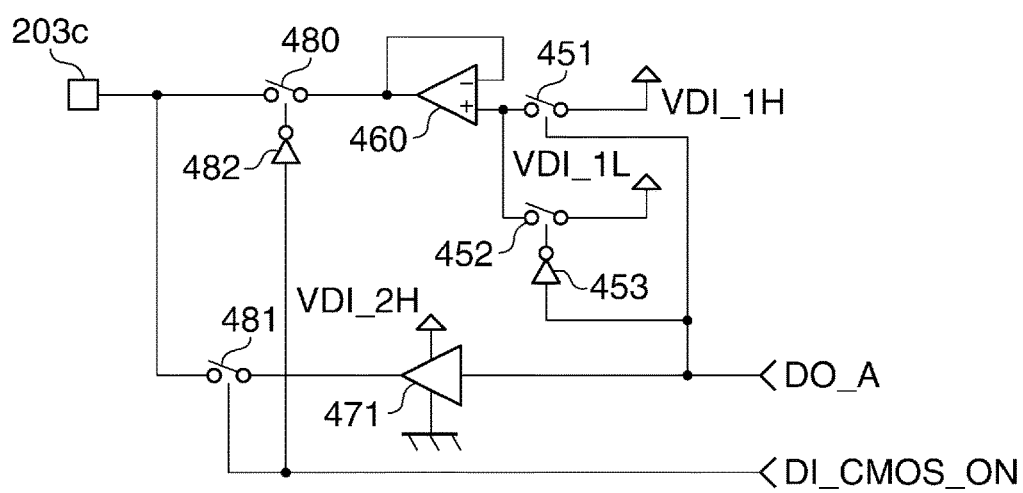

FIGS. 3A to 3C are diagrams useful in explaining the communication interface section 202 provided in the accessory 200 appearing in FIG. 1, in which FIG. 3A shows an interface circuit thereof for the clock signal delivered from the camera body 100 to the accessory 200, FIG. 3B shows an interface circuit thereof for the communication data output from the camera body 100 to the accessory 200, and FIG. 3C shows an interface circuit thereof for the communication data input from the accessory 200 to the camera body 100.

First, referring to FIG. 3A, the SCLK terminal 203a which is a communication contact between the camera body 100 and the accessory 200 is connected to a non-inverted input terminal of a comparator 401, and is connected to a non-inverted input terminal of a comparator 402. Further, the SCLK terminal 203a is connected to a non-inverted input terminal of a comparator 403, and is connected to an input terminal of a buffer 412 via an analog switch 411.

The comparator 401 has an inverted input terminal to which is applied a determination threshold voltage Vth_C3 for determining whether the voltage of the SCLK terminal 203a is the high-level voltage (VC_1H) compatible with the first communication method or the high-level voltage (VC_2H) compatible with the second communication method. Note that in the present example, VC_2H<Vth_C3<VC_1H holds. Further, the comparator 401 has an output terminal connected to a CHK_CMOS terminal of the accessory microcomputer 201.

The comparator 402 has an inverted input terminal to which is applied a threshold voltage Vth_C1 for determining whether the voltage of the SCLK terminal 203a is the high-level voltage (VC_1H) or low-level voltage (VC_1L) compatible with the first communication method. Note that in the present example, VC_1L<Vth_C1<VC_1H holds.

Further, the comparator 402 has an output terminal connected to a clock input terminal SCLK_A of the accessory microcomputer 201 via an analog switch 413.

The comparator 403 has an inverted input terminal to which is applied a determination threshold voltage Vth_C2 which is between the high-level voltage (VC_2H) and the low-level voltage (VC_2L=0 V) of the SCLK terminal 203a, which are compatible with the second communication method, and is lower than the low-level voltage (VC_1L) in the first communication method. Further, the comparator 403 has an output terminal connected to an SCLK_OK terminal of the accessory microcomputer 201.

The buffer 412 is a CMOS buffer in which the power supply voltage is the high-level voltage (VC_2H) of the SCLK terminal 203a, which is compatible with the second communication method, and has an output terminal connected to the clock input terminal (SCLK) of the accessory microcomputer 201 via an analog switch 414.

The analog switch 413 has a control terminal connected to a communication method-switching signal terminal (SCLK_CMOS_ON terminal) of the accessory microcomputer 201 via an inverter 415. Further, control terminals of the analog switches 411 and 414 are connected to the SCLK_CMOS_ON terminal of the accessory microcomputer 201.

Next, referring to FIG. 3B, the DO terminal 203b which is a communication contact between the camera body 100 and the accessory 200 is connected to a non-inverted input terminal of a comparator 421, and is also connected to a non-inverted input terminal of a comparator 422. Further, the DO terminal 203b is connected to an input terminal of a buffer 432 via an analog switch 431.

The comparator 421 has an inverted input terminal to which is applied a threshold voltage Vth_DO1 for determining whether the voltage of the DO terminal 203b is the high-level voltage (VDO_1H) or low-level voltage (VDO_1L) compatible with the first communication method. Note that in the present example, VDO_1L<Vth_DO1<VDO_1H holds. Further, the comparator 421 has an output terminal connected to a data input terminal (DI_A) of the accessory microcomputer 201 via an analog switch 433.

The comparator 422 has an inverted input terminal to which is applied a threshold voltage (connection confirmation voltage) Vth_DO2 which is between the high-level voltage (VDO_2H) and the low-level voltage (VDO_2L=0 V) of the DO terminal 203b, which are compatible with the second communication method, and is lower than the low-level voltage (VDO_1L) compatible with the first communication method. Further, the comparator 422 has an output terminal connected to a DO_OK terminal of the accessory microcomputer 201.

The buffer 432 is a CMOS buffer in which the power supply voltage is the high-level voltage (VDO_2H) of the DO terminal 203b, which is compatible with the second communication method, and has an output terminal connected to the data input terminal (DI_A) of the accessory microcomputer 201 via an analog switch 434.

The analog switch 433 has a control terminal connected to a communication method-switching signal terminal (DO_CMOS_ON terminal) of the accessory microcomputer 201 via an inverter 435. Further, control terminals of the analog switches 431 and 434 are connected to the DO_CMOS_ON terminal of the accessory microcomputer 201.

Next, referring to FIG. 3C, the data output terminal (DO_A) of the accessory microcomputer 201 is connected to a control terminal of an analog switch 451, and is connected to a control terminal of an analog switch 452 via an inverter 453. The analog switch 451 has one end to which is applied the high-level voltage (VDI_1H) of the DI terminal 203a, which is compatible with the first communication method, and the other end connected to a non-inverted input terminal of an operational amplifier 460.

The analog switch 452 has one end to which is applied the low-level voltage (VDI_1L) of the DI terminal 203c, which is compatible with the first communication method, and the other end connected to a non-inverted input terminal of the operational amplifier 460.

The operational amplifier 460 has an output terminal connected to an inverted input terminal thereof. When the voltage of the DO_A terminal of the accessory microcomputer 201 is at a high level, the operational amplifier 460 outputs the high-level voltage (VDI_1H) of the DI terminal 203c, which is compatible with the first communication method. On the other hand, when the voltage of the DO_A terminal of the accessory microcomputer 201 is at a low level, the operational amplifier 460 outputs the low-level voltage (VDI_1L) of the DI terminal 203c, which is compatible with the first communication method. Further, the output terminal of the operational amplifier 460 is connected to one end of an analog switch 480.

The data output terminal (DO_A) of the accessory microcomputer 201 is connected to an input terminal of a CMOS output buffer 471 that outputs a high-level voltage (VDI_2H) or low level (VDI_2L=0 V) compatible with the second communication method to the DI terminal 203c. Further, an output terminal of the CMOS output buffer 471 is connected to one end of an analog switch 481.

The analog switch 480 has the other end connected to the DI terminal 203c which is a communication contact between the camera body 100 and the accessory 200. Further, the analog switch 480 has a control terminal connected to a communication method-switching signal terminal (DI_CMOS_ON terminal) of the accessory microcomputer 201 via an inverter 482.

Similarly, the analog switch 481 has the other end connected to the DI terminal 203c. Further, the analog switch 481 has a control terminal connected to the communication method-switching signal terminal (DI_CMOS_ON terminal) of the accessory microcomputer 201.

With this configuration, when the accessory microcomputer 201 sets the voltage of the CMOS_ON terminal to the low level, the output from and input to the communication contact section 203 can be set to those in the first communication method. Further, when the accessory microcomputer 201 sets the voltage of the CMOS_ON terminal to the high level, the output from and input to the communication contact section 203 can be set to those in the second communication method.

Figure 4A:
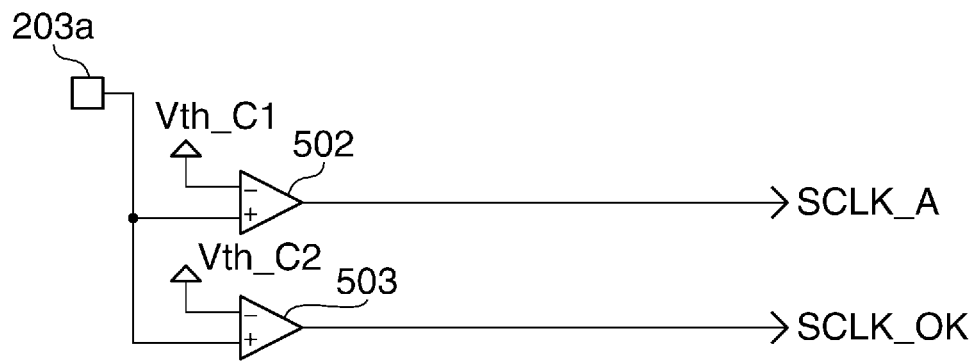
Figure 4B:
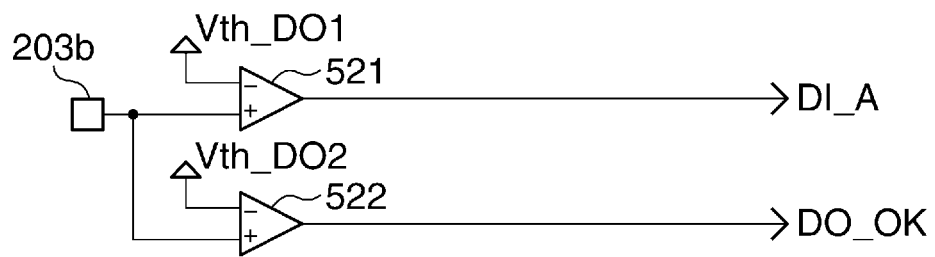
Figure 4C:
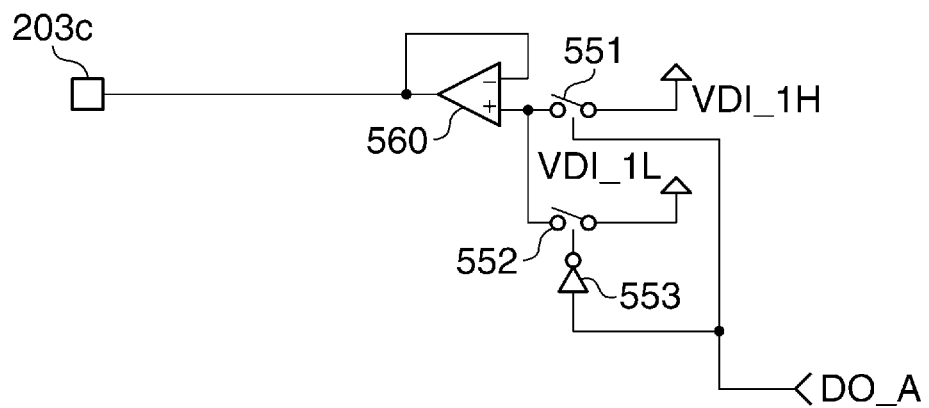

FIGS. 4A to 4C are diagrams useful in explaining a case where the communication interface section 202 of the accessory 200 appearing in FIG. 1 are formed by interface circuits compatible only with the first communication method, in which FIG. 4A shows an interface circuit thereof for the clock signal delivered from the camera body 100 to the accessory 200, FIG. 4B shows an interface circuit thereof for the communication data output from the camera body 100 to the accessory 200, and FIG. 4C shows an interface circuit thereof for the communication data input from the accessory 200 to the camera body 100.

Referring to FIG. 4A, the SCLK terminal 203a which is the communication contact between the camera body 100 and the accessory 200 is connected to a non-inverted input terminal of a comparator 502 and a non-inverted input terminal of a comparator 503. The comparator 502 has an inverted input terminal to which is applied the threshold voltage Vth_C1 for determining whether the voltage of the SCLK terminal 203a is the high-level voltage (VC_1H) or low-level voltage (VC_1L) compatible with the first communication method. Note that in the present example, VC_1L<Vth_C1<VC_1H holds. Further, the comparator 502 has an output terminal connected to the clock input terminal SCLK_A of the accessory microcomputer 201.

The comparator 503 has an inverted input terminal to which is applied the threshold voltage Vth_C2 which is between the high-level voltage (VC_2H) and the low-level voltage (VC_2L=0 V) of the SCLK terminal 203a, which are compatible with the second communication method, and also is lower than the low-level voltage (VC_1L) compatible with the first communication method. Further, the comparator 503 has an output terminal connected to the SCLK_OK terminal of the accessory microcomputer 201.

Referring to FIG. 4B, the DO terminal 203b which is the communication contact point between the camera body 100 and the accessory 200 is connected to a non-inverted input terminal of a comparator 521 and a non-inverted input terminal of a comparator 522. The comparator 521 has an inverted input terminal to which is applied the threshold voltage Vth_DO1 for determining whether the voltage of the DO terminal 203b is the high-level voltage (VDO_1H) or low-level voltage (VDO_1L) compatible with the first communication method. Note that in the present example, VDO_1L<Vth_DO1<VDO_1H holds. Further, the comparator 521 has an output terminal connected to the data input terminal DI_A of the accessory microcomputer 201.

The comparator 522 has an inverted input terminal to which is applied the threshold voltage Vth_DO2 which is between the high-level voltage (VDO_2H) and the low-level voltage (VDO_2L=0 V) of the DO terminal 203b, which are compatible with the second communication method, and also is lower than the low-level voltage (VDO_1L) compatible with the first communication method. Further, the comparator 522 has an output terminal connected to the DO_OK terminal of the accessory microcomputer 201.

Next, referring to FIG. 4C, the data output terminal DO_A of the accessory microcomputer 201 is connected to a control terminal of an analog switch 551, and is connected to a control terminal of an analog switch 552 via an inverter 553. The analog switch 551 has one end to which is applied the high-level voltage (VDI_1H) of the DI terminal 203a, which is compatible with the first communication method, and the other end connected to a non-inverted input terminal of an operational amplifier 560.

The analog switch 552 has one end to which is applied the low-level voltage (VDI_1L) of the DI terminal 203c, which is compatible with the first communication method. Further, the analog switch 552 has the other end connected to the non-inverted input terminal of the operational amplifier 560.

The operational amplifier 560 has an output terminal connected to an inverted input terminal thereof and the DI terminal 203c. When the voltage of the DO_A terminal of the accessory microcomputer 201 is at the high level, the operational amplifier 560 outputs the high-level voltage (VDI_1H) of the DI terminal 203c, which is compatible with the first communication method. On the other hand, when the voltage of the DO_A terminal of the accessory microcomputer 201 is at the low level, the operational amplifier 560 outputs the low-level voltage (VDI_1L) of the DI terminal 203c, which is compatible with the first communication method.

Figure 5:
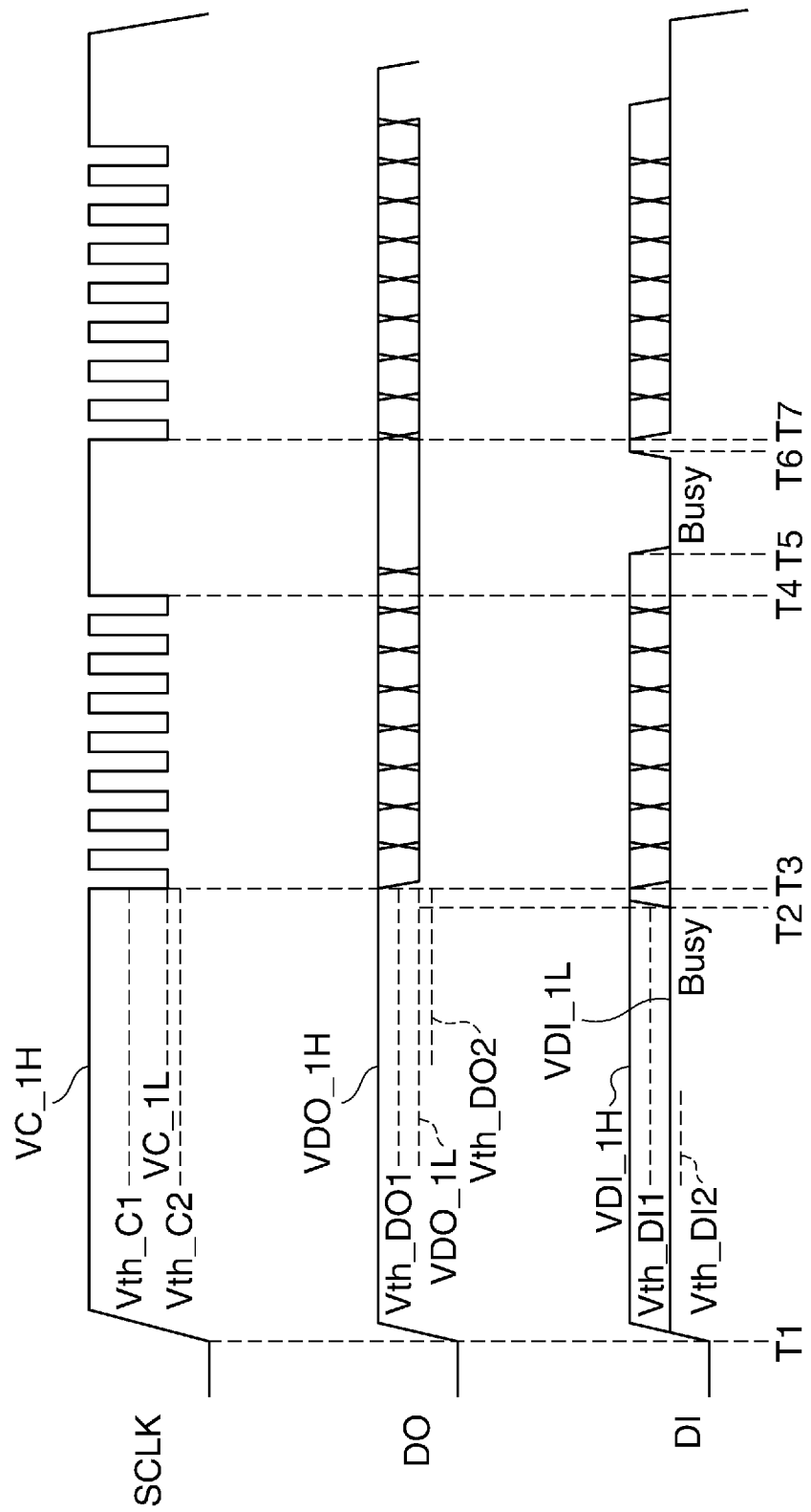
FIG. 5 is a timing diagram useful in explaining states of communication terminals (connection terminals) of the camera shown in FIG. 1 in the first communication method.

FIG. 5 is a timing diagram useful in explaining states of the communication terminals (connection terminals) of the camera shown in FIG. 1 in the first communication method.

Referring to FIG. 5, the high level and low level of the SCLK signal are represented by VC_1H and VC_1L, respectively. Further, the threshold value set between the high level and the low level is represented by Vth_C1, and VC_1L is higher than Vth_C2 (>0 V).

The high level and low level of the DO signal are represented by VDO_1H and VDO_1L (>0 V), respectively. Further, the threshold value set between the high level and the low level is represented by Vth_DO1, and VDO_1L is higher than Vth_DO2 (>0 V).

The high level and low level of the DI signal are represented by VDI_1H and VDI_1L (>0 V), respectively. Further, the threshold value set between the high level and the low level is represented by Vth_DI1, and VDI_1L is higher than Vth_DI2 (>0 V).

For example, when the camera is started at a time point T1, if the DI signal is at VDI_1H, it indicates that the accessory microcomputer 201 is in a communicable state. On the other hand, if the DI signal is at VDI_1L, it indicates that the accessory microcomputer 201 is in an incommunicable (busy) state.

At a time point T2, the camera microcomputer 101 confirms that the DI signal indicates that the accessory microcomputer 201 has exited the busy state. Then, at a time point T3, the camera microcomputer 101 starts communication and delivers the SCLK signal to the accessory 200 (from T3 to T4).

At a time point T5, the accessory microcomputer 201 sets the DI signal to the VDI_1L level so as to analyze the received data and enters the busy state (from T5 to T6). Then, at a time point T7, the camera microcomputer 101 confirms that the accessory 200 has exited the busy state again, whereupon the camera microcomputer 101 starts the next communication.

Figure 6:
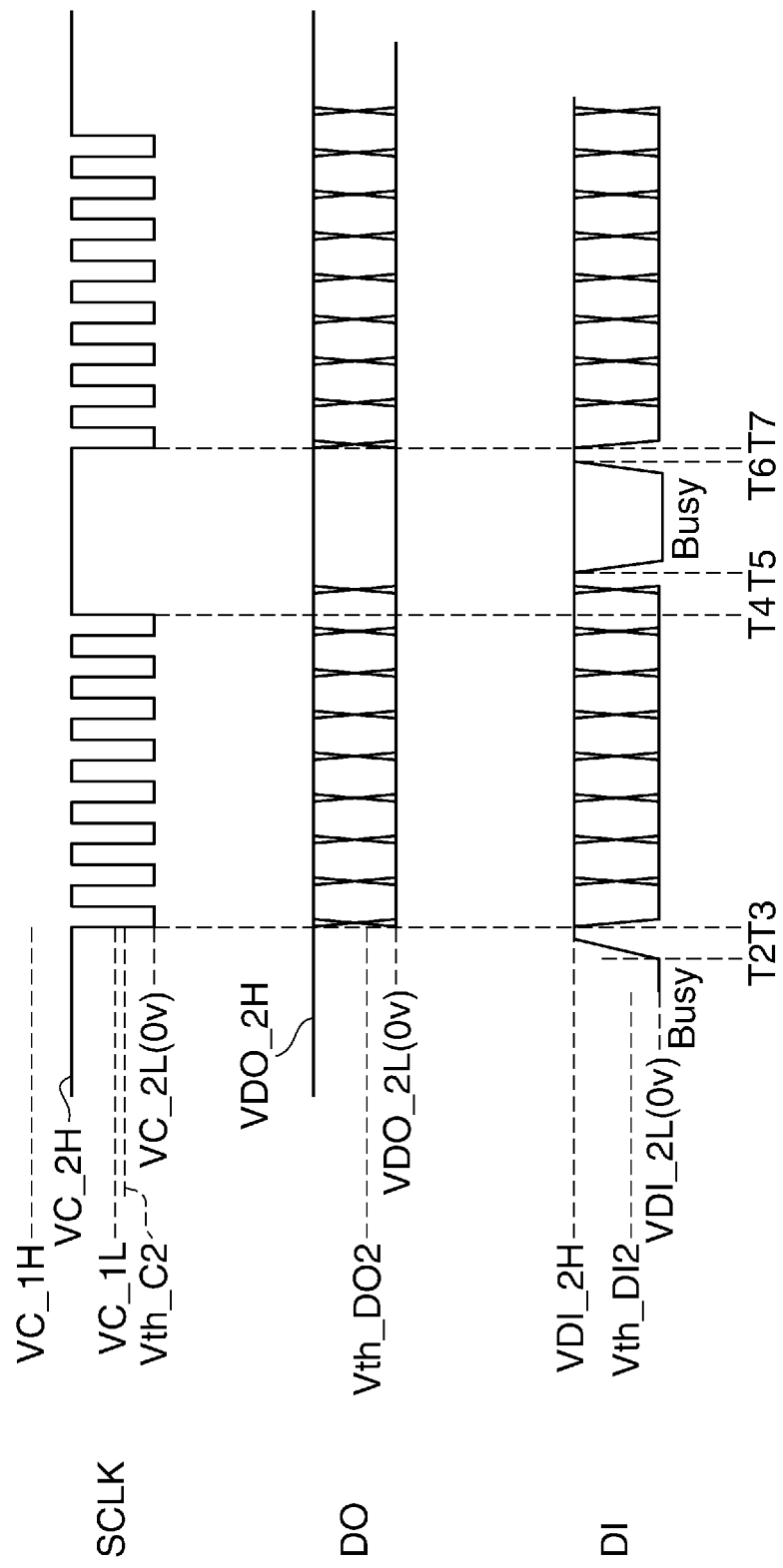
FIG. 6 is a timing diagram useful in explaining states of the communication terminals (connection terminals) of the camera shown in FIG. 1 in a second communication method.

FIG. 6 is a timing diagram useful in explaining states of the communication terminals (connection terminals) of the camera shown in FIG. 1 in the second communication method.

Referring to FIG. 6, the high level and low level of the SCLK signal are represented by VC_2H (VC_1L<VC_2H<VC_1H) and VC_2L (=0 V), respectively. Further, the high level and low level of the DO signal are represented by VDO_2H (≤VDO_1H) and VDO_2L (=0 V), respectively. Further, the high level and low level of the DI signal are represented by VDI_2H (≤VDI_1H) and VDI_2L (=0 V), respectively.

When the DI signal is at VDI_2H, the accessory microcomputer 201 is in a communicable state, whereas when the DI signal is at VDI_2L, the accessory microcomputer 201 is in an incommunicable (busy) state. At a time point T2, the camera microcomputer 101 confirms that the accessory microcomputer 201 has exited from the busy state. Then, at a time point T3, the camera microcomputer 101 starts communication (from T3 to T4).

At a time point T5, the accessory microcomputer 201 sets the DI signal to a VDI_2L level so as to analyze the received data, and enters the busy state (from T5 to T6). Then, when the camera microcomputer 101 confirms that the accessory microcomputer 201 has exited the busy state again at a time point T7, the camera microcomputer 101 starts the next communication.

Figure 7:
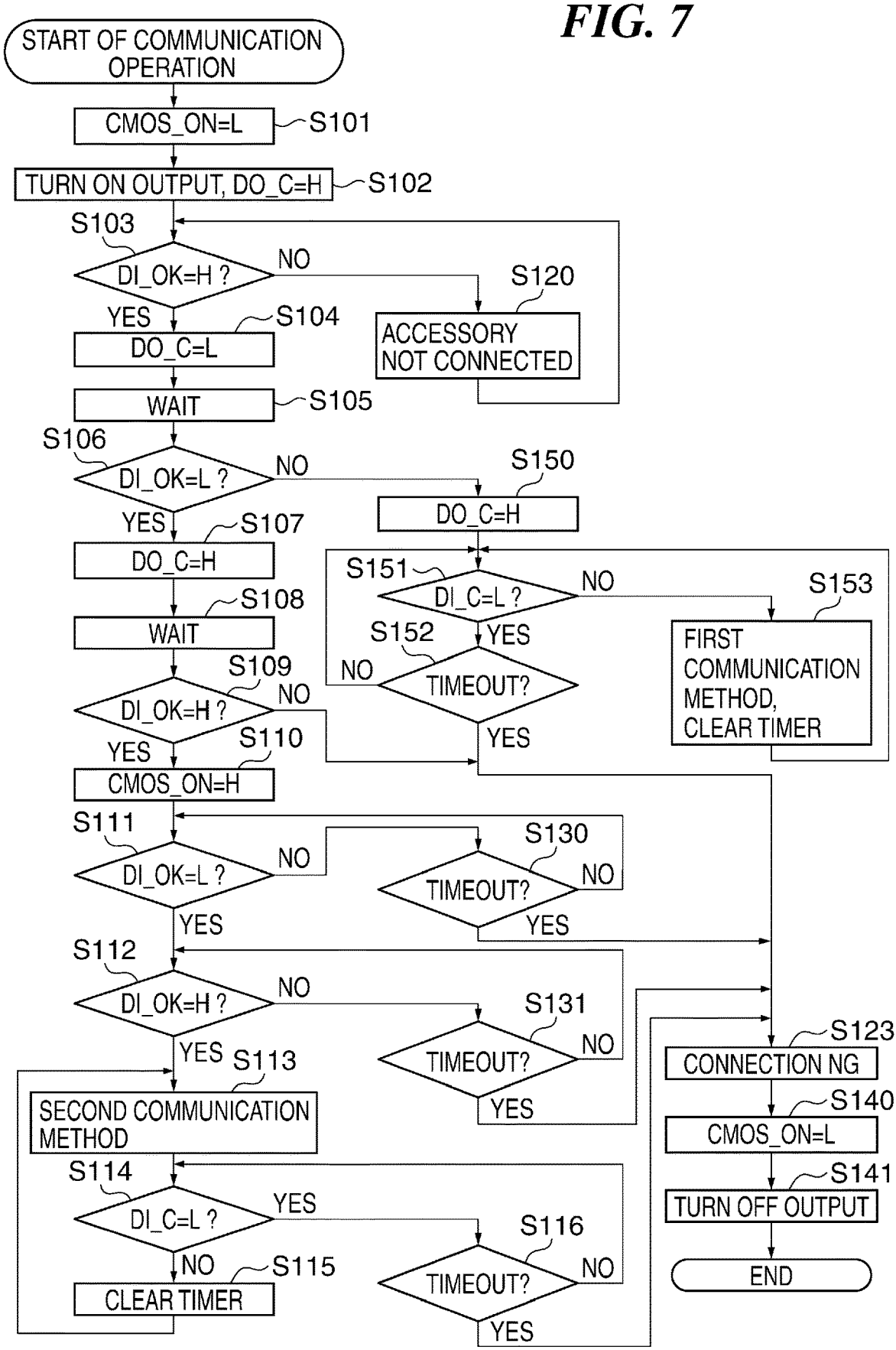
FIG. 7 is a flowchart of a process for controlling a communication operation of a camera microcomputer appearing in FIG. 1.

FIG. 7 is a flowchart of a process for controlling a communication operation of the camera microcomputer 101 appearing in FIG. 1.

Figure 8:
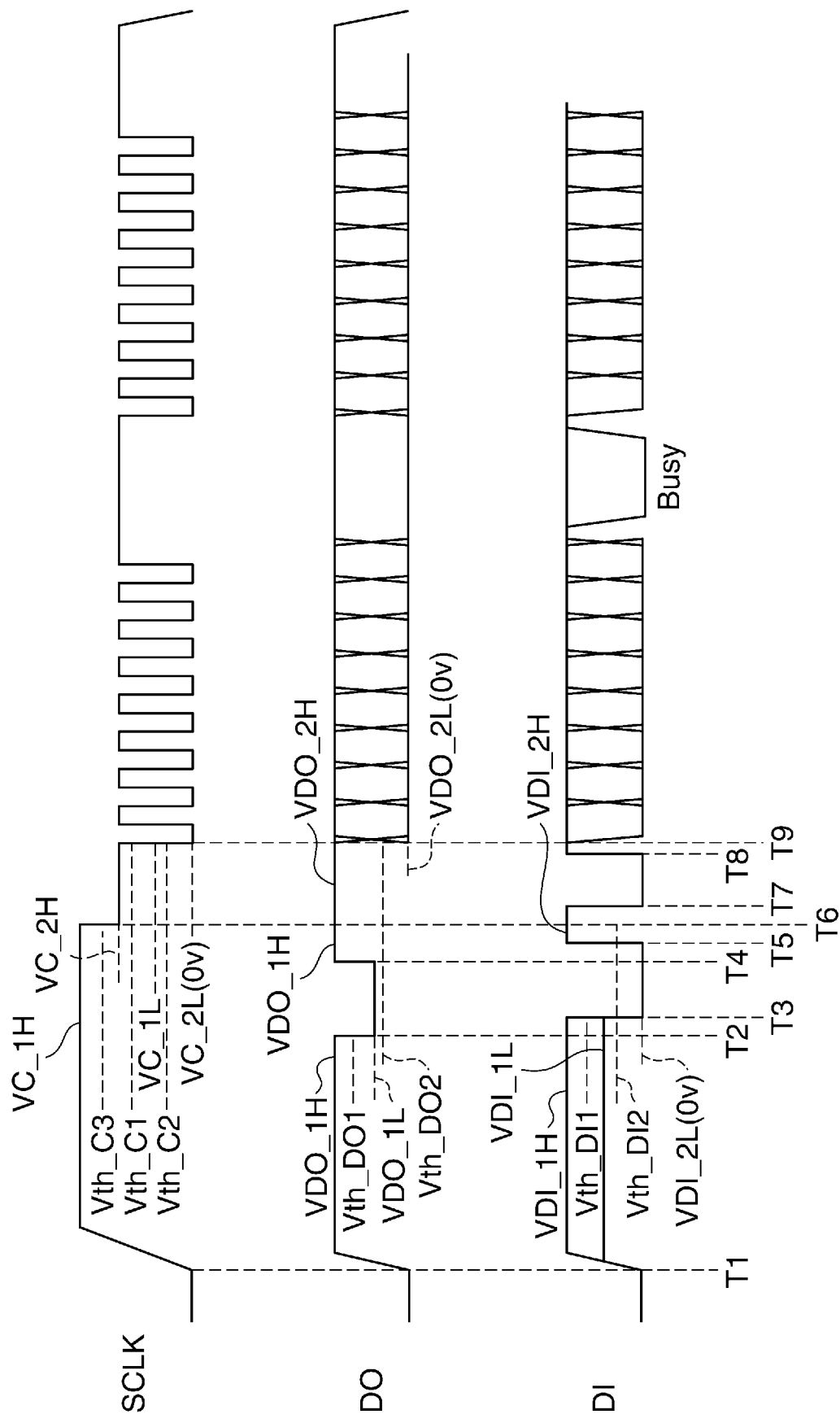
FIG. 8 is a timing diagram useful in explaining a state of each communication terminal (connection terminal) of the camera shown in FIG. 1 when confirming connection of the communication terminal and shifting the communication method to the second communication method.

Further, FIG. 8 is a timing diagram useful in explaining a state of each communication terminal (connection terminal) of the camera shown in FIG. 1 when confirming connection of the communication terminal and shifting the communication method to the second communication method. Further, FIG. 9 is a timing diagram useful in explaining a state of each communication terminal in a case where the accessory 200 appearing in FIG. 1 is compatible only with the first communication method.

Figure 9:
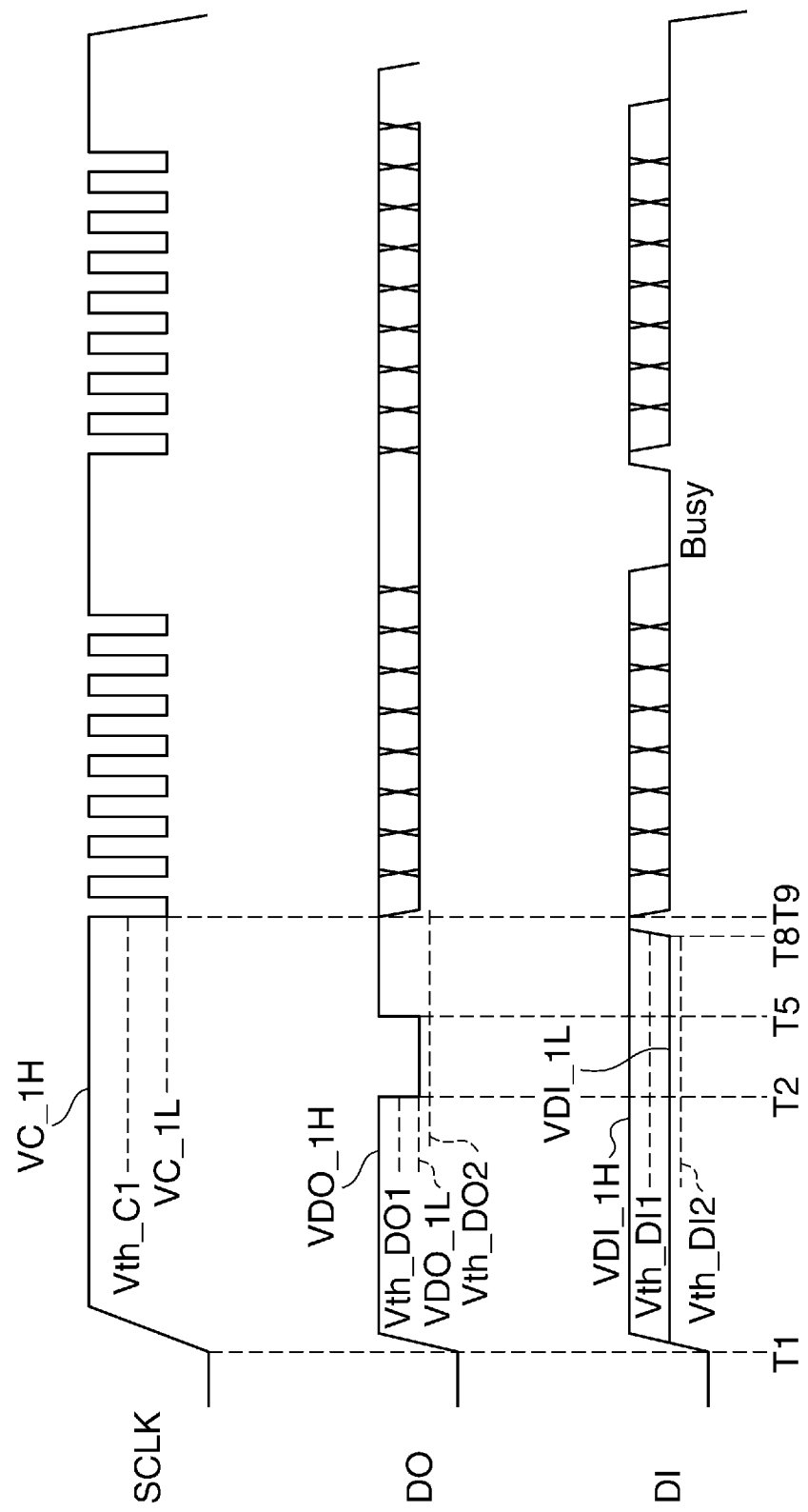
FIG. 9 is a timing diagram useful in explaining a state of each communication terminal in a case where the accessory appearing in FIG. 1 is compatible only with the first communication method.

Referring to FIGS. 7 to 9, when the camera microcomputer 101 is started or a release switch (not shown) thereof is half-pressed, the camera microcomputer 101 sets the voltage of the CMOS_ON terminal to the low level to thereby set the communication interface section 102 to the first communication method (step S101). Then, the camera microcomputer 101 supplies electric power to the communication interface section 102 to thereby turn on the output of the communication interface section 102 (step S102). At this time, the camera microcomputer 101 sets the voltages of the DO_C terminal and the SCLK_C terminal to the high levels (at a time point T1 in FIG. 8).

Then, the camera microcomputer 101 determines whether or not the voltage of the DI_OK terminal is at the high level (step S103). If the voltage of the DI_OK terminal is at the low level (No to the step S103), the camera microcomputer 101 determines that the accessory 200 is not connected to the terminals of the communication contact section 103 (step S120). Then, the camera microcomputer 101 returns to the step S103, and monitors the connection state of the terminals of the communication contact section 103 until the operation of the camera 100 is stopped.

If the voltage of the DI_OK terminal is at the high level (YES to the step S103), the camera microcomputer 101 confirms connection to the accessory 200, and starts to check whether or not the accessory 200 is compatible with the second communication method. In this step, first, the camera microcomputer 101 sets the voltage of the DO_C terminal to the low level (step S104).

With this, the camera microcomputer 101 sets the voltage of the connection terminal 103b (DO terminal) to VDO_1L in a state where the voltage of the connection terminal 103a (SCLK terminal) is at VC_1H (at a time point T2 in FIGS. 8 and 9).

Next, the camera microcomputer 101 waits for a predetermined time period (time period within which a response to the DI signal can be received from the accessory 200: up to a time point T3 in FIG. 8) (step S105: WAIT). Then, the camera microcomputer 101 determines whether or not the voltage of the DI_OK terminal is at the low level (step S106).

If the voltage of the DI_OK terminal is at the high level (NO to the step S106), the camera microcomputer 101 determines that connection of the connected accessory 200 has not been confirmed and that there is a possibility that the accessory 200 is compatible only with the first communication method, so that the camera microcomputer 101 sets the voltage of the DO_C terminal to the high level (step S150: at a time point T5 in FIG. 9).

Then, the camera microcomputer 101 determines whether or not the DI_C terminal is at the low level (step S151). If the voltage of the DI_C terminal is at the low level (YES to the step S151), i.e. if the connection terminal 103c (DI terminal) is at VDI_1L, which means that the accessory 200 is in the busy state, the camera microcomputer 101 determines whether or not a timeout period has elapsed (step S152). In this step, the camera microcomputer 101 determines whether or not a state where the voltage of the DI_C terminal is at the low level has continued for a predetermined time period (sum of one byte time by the first communication method and an upper limit of busy time of the accessory 200).

If the timeout period has not elapsed (NO to the step S152), the camera microcomputer 101 returns to the step S151. On the other hand, if the timeout period has elapsed (YES to the step S152), the camera microcomputer 101 proceeds to a step S123, described hereinafter.

If the voltage of the DI_C terminal is at the high level (No to the step S151), the camera microcomputer 101 clears a timer for counting a time period during which the voltage of the DI_C terminal is at the low level (step S153), and communicates with the accessory 200 by the first communication method. Then, the camera microcomputer 101 returns to the step S151 (time from a time point T8 to a time point T9 in FIG. 9).

If the voltage of the DI_OK terminal is at the low level (YES to the step S106), the camera microcomputer 101 sets the voltage of the DO_C terminal to the high level (step S107) to thereby set the voltage of the connection terminal 103b (DO terminal) to VDO_1H (at a time point T4 in FIG. 8). Then, the camera microcomputer 101 waits for a predetermined time period (time period within which a response to the DI signal can be received from the accessory 200) (step S108) (at a time point T5 in FIG. 8).

Then, the camera microcomputer 101 determines whether or not the voltage of the DI_OK terminal is at the high level (step S109). If the voltage of the DI_OK terminal is at the low level (NO to the step S109), the camera microcomputer 101 proceeds to the step S123, described hereinafter.

If the voltage of the DI_OK terminal is at the high level (YES to the step S109), judging that connection of the camera microcomputer 101 to the accessory 200 and compatibility of the accessory 200 with the second communication method have been confirmed, the camera microcomputer 101 sets the voltage of the CMOS_ON terminal to the high level (step S110). This switches the communication method of the communication interface section 102 to the second communication method (at a time point T6 in FIG. 8).

As a result, the connection terminal 103a (SCLK terminal) is changed to VC_2H, and the connection terminal 103b (DO terminal) is at VDO_2H. Note that in the DO terminal, VDO_1H=VDO_2H holds.

Then, the camera microcomputer 101 determines whether or not the voltage of the DI_OK terminal is at the low level so as to confirm whether or not the communication method of the accessory 200 has been changed to the second communication method (step S111). If the voltage of the DI_OK terminal is at the high level (NO to the step S111), the camera microcomputer 101 determines whether or not a timeout period has elapsed (step S130). In this step, the camera microcomputer 101 determines whether or not the time period in which a response to the DI signal can be received from the accessory 200 has elapsed (time period up to a time point T7 in FIG. 8).

If the timeout period has elapsed (YES to the step S130), the camera microcomputer 101 proceeds to the step S123, described hereinafter. On the other hand, if the timeout period has not elapsed (NO to the step S130), the camera microcomputer 101 returns to the step S111.

If the voltage of the DI_OK terminal is at the low level (YES to the step S111), the camera microcomputer 101 determines whether or not the voltage level of the DI_OK terminal is changed to the high level (step S112). If the voltage level of the DI_OK terminal is not changed to the high level, i.e. if the DI_OK terminal remains at the low level (NO to the step S112), the camera microcomputer 101 determines whether or not a timeout period has elapsed (step S131). In this step, the camera microcomputer 101 determines whether or not the time period in which a response can be received from the accessory 200 has elapsed (time period up to a time point T8 in FIG. 8).

If the timeout period has elapsed (YES to the step S131), the camera microcomputer 101 proceeds to the step S123, described hereinafter. On the other hand, if the timeout period has not elapsed (NO to the step S131), the camera microcomputer 101 returns to the step S112.

If the voltage level of the DI_OK terminal is changed to the high level (YES to the step S112), the camera microcomputer 101 determines that the accessory 200 has completed changing the communication method to the second communication method to make the accessory 200 communicable (at the time point T8 in FIG. 8). Then, the camera microcomputer 101 communicates with the accessory 200 by the second communication method (step S113).

Then, the camera microcomputer 101 determines whether or not the voltage of the DI_C terminal is at the low level (step S114). If the voltage of the DI_C terminal is at the high level (NO to the step S114), the camera microcomputer 101 clears a timer for counting a time period during which the voltage of the DI_C terminal is at the low level (step S115), and returns to the step S113.

On the other hand, if the voltage of the DI_C terminal is at the low level (YES to the step S114), the camera microcomputer 101 determines whether or not the timeout period has elapsed (step S116). In this step, the camera microcomputer 101 determines whether or not the sum of one byte time by the second communication method and the upper limit of busy time of the accessory 200 has elapsed.

If the timeout period has not elapsed (NO to the step S116), the camera microcomputer 101 returns to the step S114. On the other hand, if the timeout period has elapsed (YES to the step S116), the camera microcomputer 101 determines that the accessory 200 has been disconnected or the accessory 200 is in a power-off state (step S123: connection NG).

Next, the camera microcomputer 101 sets the voltage of the CMOS_ON terminal to the low level (step S140) to thereby set the communication interface section 102 to the first communication method. Thereafter, the camera microcomputer 101 stops power supply to the communication interface section 102 to thereby turn off the output of the communication interface section 102 (step S141), followed by terminating communication with the accessory 200.

Figure 10:
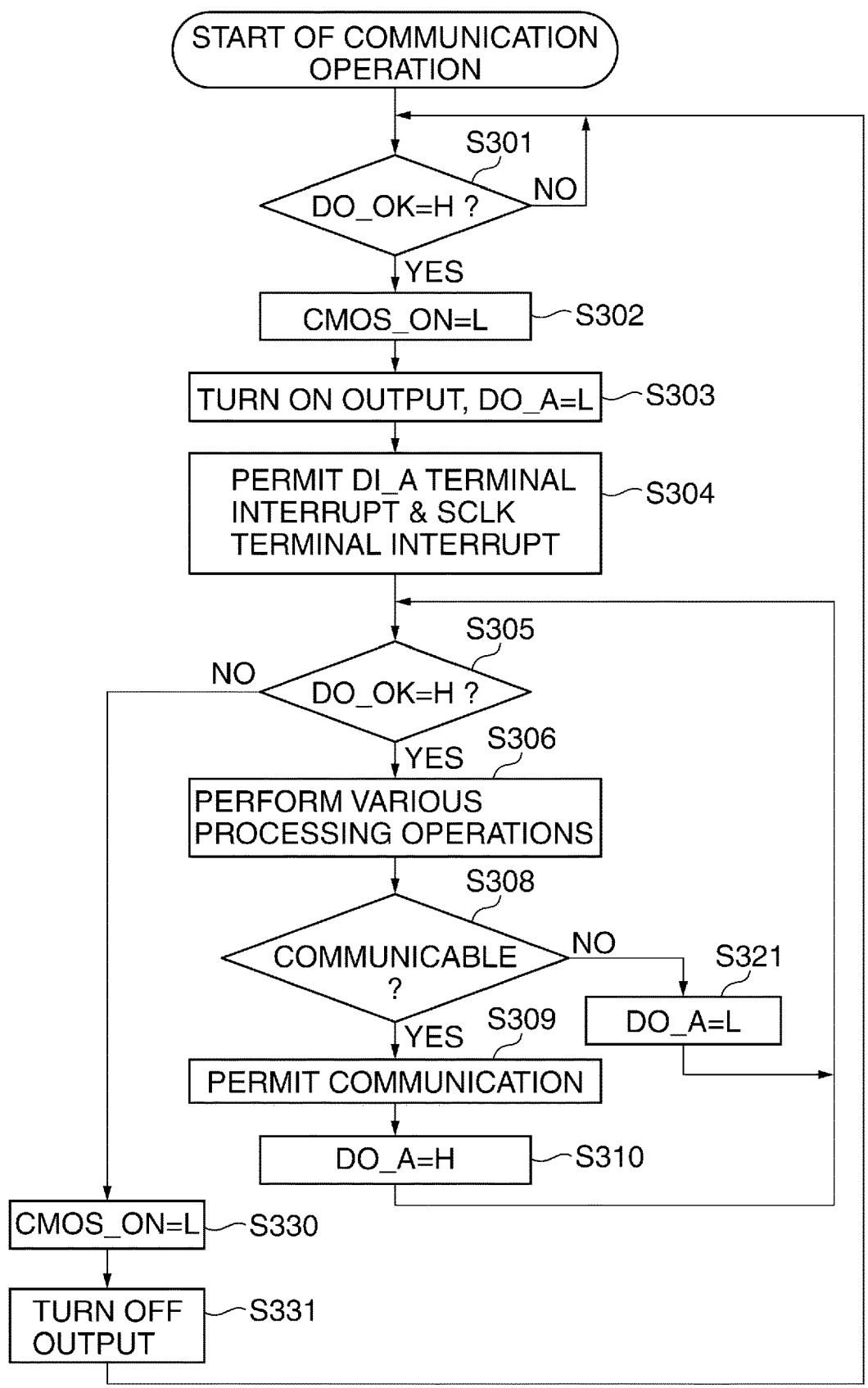
FIG. 10 is a flowchart of a process for controlling a communication operation of an accessory microcomputer appearing in FIG. 1.

FIG. 10 is a flowchart of a process for controlling a communication operation of the accessory microcomputer 201 appearing in FIG. 1.

After starting the communication operation, the accessory microcomputer 201 determines whether or not the voltage of the DO_OK terminal is at the high level so as to check whether or not the voltage of the DO terminal (connection terminal 203b appearing in FIGS. 3A to 3C) is higher than the connection confirmation voltage Vth_DO2 (step S301). If the voltage of the DO_OK terminal is at the low level (NO to the step S301), the accessory microcomputer 201 waits until the accessory 200 is connected to the camera body 100 and also the camera enters an activated state.

If the voltage of the DO_OK terminal is at the high level (YES to the step S301), the accessory microcomputer 201 sets the voltages of the SCLK_CMOS_ON terminal, the DO_CMOS_ON terminal, and the DI_CMOS_ON terminal to the low levels to thereby set the communication method of the communication interface section 202 to the first communication method (step S302).

Next, the accessory microcomputer 201 sets the voltage of the connection terminal 203c (DI terminal) to VDI_1L (at the time point T1 in FIG. 8) and sets the voltage of the DO_A terminal to the low level (step S303). The accessory microcomputer 201 thus notifies the camera body 100 of the busy state of the accessory 200.

Next, when the voltage of the connection terminal 203b (DO terminal) is changed from VDO_1H to VOD_1L, the accessory microcomputer 201 permits interruption (hereinafter referred to as the DI_A terminal interrupt of the accessory microcomputer 201). Further, when the voltage of the SCLK terminal 203a is changed from VC_1H to VC_1L due to the start of communication, the accessory microcomputer 201 permits interruption (step S304: SCLK_A terminal interrupt of the accessory microcomputer 201).

Then, the accessory microcomputer 201 checks whether or not the voltage of the DO_OK terminal is at the high level (step S305). If the voltage of the DO_OK terminal is at the high level (YES to the step S305), the accessory microcomputer 201 performs predetermined various processing operations on communication data (step S306). Then, the accessory microcomputer 201 determines whether or not the state of the accessory 200 is changed to the communicable state by the processing operations performed in the step S306 (step S308).

If the accessory 200 has been changed into the communicable state (YES to the step S308), the accessory microcomputer 201 sets communication permission (step S309). Then, the accessory microcomputer 201 sets the voltage of the DO_A terminal to the high level (step S310) to thereby notify the camera body 101 via the connection terminal 203c (DI terminal) that the accessory microcomputer 201 has exited the busy state. Then, the accessory microcomputer 201 returns to the step S305.

If the accessory 200 has not been changed into the communicable state (NO to the step S308), the accessory microcomputer 201 sets the voltage of the DO_A terminal to the low level (step S321) to thereby notify the camera body 100 of the busy state thereof via the connection terminal 203c (DI terminal). Then, the accessory microcomputer 201 returns to the step S305.

If the voltage of the DO_OK terminal is at the low level (NO to the step S305), judging that the interface of the camera body 100 is powered off or the camera body 100 has been disconnected, the accessory microcomputer 201 sets the voltages of the SCLK_CMOS_ON terminal, the DO_CMOS_ON terminal, and the DI_CMOS_ON terminal to the low levels (step S330). The accessory microcomputer 201 thus sets the communication method of the communication interface section 202 to the first communication method. Thereafter, the accessory microcomputer 201 turns off the output of the connection terminal 203c (DI terminal) (step S331) and returns to the step S301.

Figure 11:
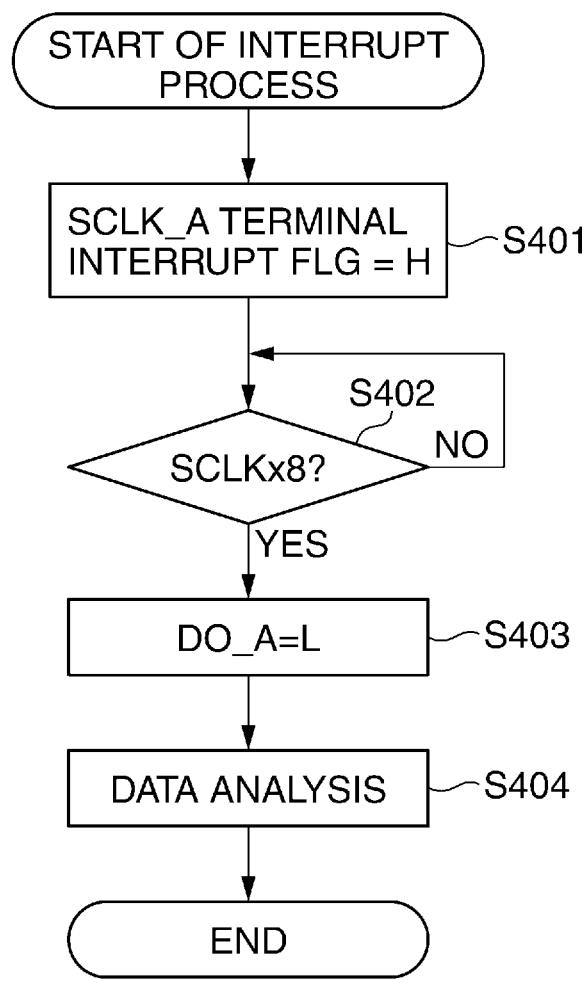
FIG. 11 is a flowchart of an SCLK_A terminal interrupt process performed by the accessory microcomputer appearing in FIG. 1.

FIG. 11 is a flowchart of an SCLK_A terminal interrupt process performed by the accessory microcomputer 201 appearing in FIG. 1.

When the camera microcomputer 101 changes the voltage of the connection terminal 101a (SCLK terminal) from VC_1H to VC_1L, the accessory microcomputer 201 starts the interrupt process. First, the accessory microcomputer 201 sets a flag indicative of an SCLK_A terminal interrupt (step S401: SCLK_A terminal interrupt FLG=H).

Then, the accessory microcomputer 201 determines whether or not the SCLK signal has been received from the camera microcomputer 101 a predetermined number of (e.g. 8) times (step S402). If the number of times of reception of the SCLK signal has not reached the predetermined number (NO to the step S402), the accessory microcomputer 201 waits.

On the other hand, if the SCLK signal has been received the predetermined number of times (YES to the step S402), the accessory microcomputer 201 sets the voltage of the DO_A terminal to the low level (step S403) to thereby notify the camera body 100 of the busy state thereof via the connection terminal 203c (DI terminal). Then, the accessory microcomputer 201 analyzes data received via the connection terminal 203b (DO terminal) (step S404), followed by terminating the interrupt process.

Figure 12:
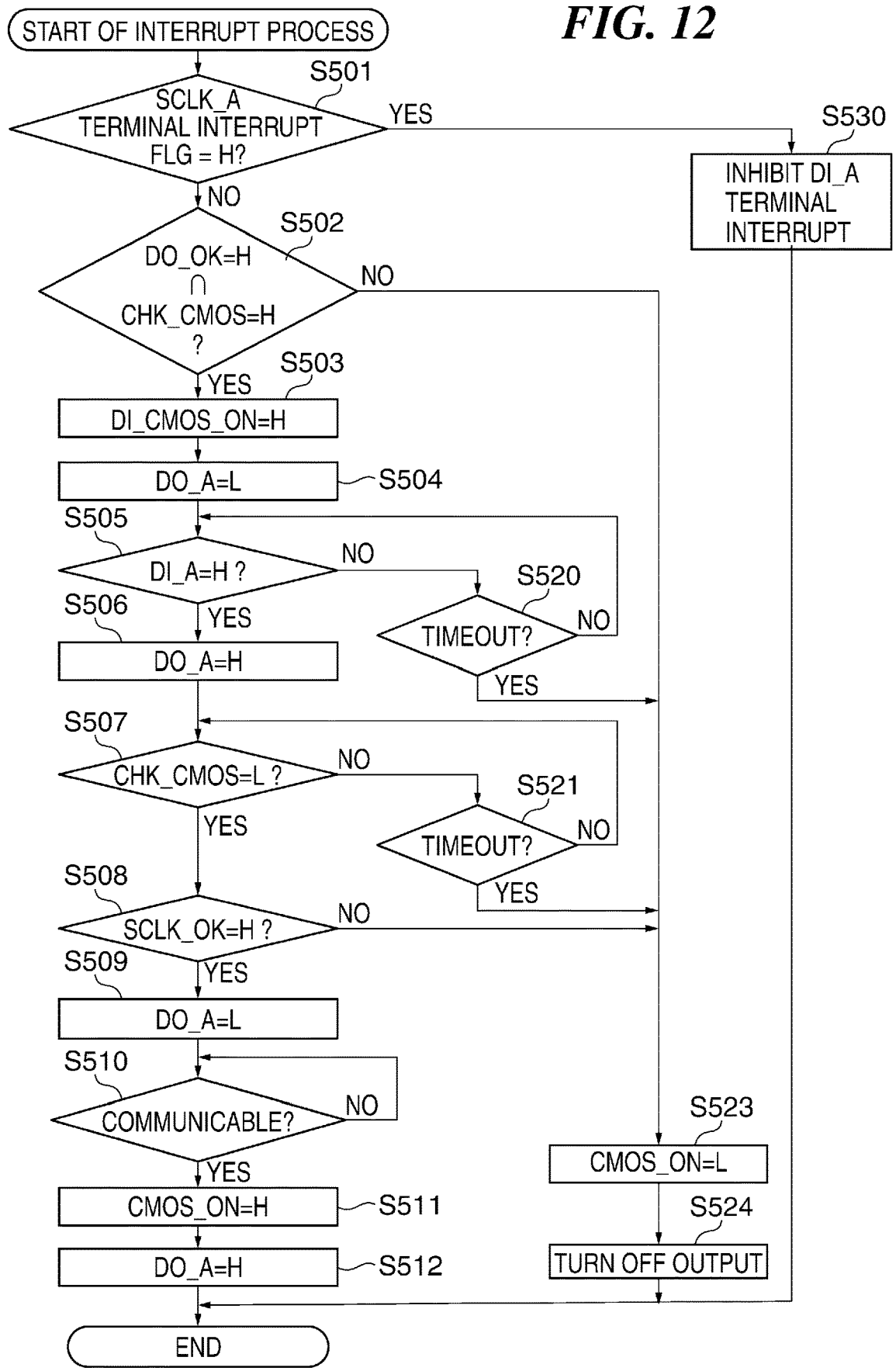
FIG. 12 is a flowchart of a DI_A terminal interrupt process performed by the accessory microcomputer appearing in FIG. 1.

FIG. 12 is a flowchart of a DI_A terminal interrupt process performed by the accessory microcomputer 201 appearing in FIG. 1.

When the camera microcomputer 101 changes the voltage of the connection terminal 101b (DO terminal) from VDO_1H to VDO_1L, the accessory microcomputer 201 starts the interrupt process (at the time point T2 in FIG. 8). Then, the accessory microcomputer 201 determines whether or not SCLK_A terminal interrupt FLG=H holds (step S501). That is, the accessory microcomputer 201 determines whether or not communication by the first communication method has been performed before the camera microcomputer 101 performs confirmation of connection and compatibility with the second communication method of the accessory 200.

If the SCLK_A terminal interrupt FLG=H holds (YES to the step S501), the accessory microcomputer 201 determines that communication by the first communication method has been performed and inhibits the DI_A terminal interrupt (step S530), followed by terminating the interrupt process.

If the SCLK_A terminal interrupt FLG=H does not hold (NO to the step S501), the accessory microcomputer 201 determines whether or not the voltage of the DO_OK terminal is at the high level and also the voltage of the CHK_CMOS terminal is at the high level (step S502). If the voltage of the DO_OK terminal is at the high level and also the voltage of the CHK_CMOS terminal is at the high level (YES to the step S502), the accessory microcomputer 201 sets the voltage of the DI_CMOS_ON terminal to the high level so as to respond to the connection check from the camera microcomputer 101 (step S503). That is, the accessory microcomputer 201 sets the connection terminal 203c (DI terminal) to the second communication method.

Then, the accessory microcomputer 201 sets the voltage of the DO_A terminal to the low level (step S504). Then, the accessory microcomputer 201 outputs the voltage VDI_2L (0 V) to the connection terminal 203c (DI terminal) (at the time point T3 in FIG. 8). Thereafter, the accessory microcomputer 201 determines whether or not the voltage of the DI_A terminal is changed to the high level (step S505). That is, the accessory microcomputer 201 determines whether or not the voltage of the connection terminal 203b (DO terminal) is changed to VDO_1H (at the time point T4 in FIG. 8).

If the voltage of the DI_A terminal remains at the low level (NO to the step S505), the accessory microcomputer 201 determines whether or not a predetermined timeout period has elapsed (step S520). In this step, the accessory microcomputer 201 determines whether or not a time period has elapsed which takes for the camera microcomputer 101 to detect VDI_2L of the connection terminal 203c (DI terminal) and change the voltage of the connection terminal 203b (DO terminal) from VDO_1L to VDO_1H.

If the predetermined timeout period has elapsed (YES to the step S520), the accessory microcomputer 201 proceeds to a step S523, described hereinafter. On the other hand, if the predetermined timeout period has not elapsed (NO to the step S520), the accessory microcomputer 201 returns to the step S505.

If the voltage of the DI_A terminal is at the high level (YES to the step S505), the accessory microcomputer 201 sets the voltage of the DO_A terminal to the high level (step S506). That is, the accessory microcomputer 201 sets the voltage of the connection terminal 203c (DI terminal) to VDI_2H (at the time point T5 in FIG. 8).

Then, the accessory microcomputer 201 determines whether or not the voltage of the CHK_CMOS terminal is changed to the low level (step S507). That is, the accessory microcomputer 201 determines whether or not the voltage of the connection terminal 203a (SCLK terminal) is changed to VC_2H (at the time point T6 in FIG. 8).

If the CHK_ CMOS terminal remains at the high level (NO to the step S507), the accessory microcomputer 201 determines whether or not a predetermined timeout period has elapsed (step S521). In this step, the accessory microcomputer 201 determines whether or not a time period has elapsed which takes for the camera microcomputer 101 to detect VDI_2H of the connection terminal 203c (DI terminal) and change the voltage of the connection terminal 203a (SCLK terminal) from VC_1H to VC_2H.

If the predetermined timeout period has elapsed (YES to the step S521), the accessory microcomputer 201 proceeds to the step S523, described hereinafter. On the other hand, if the predetermined timeout period has not elapsed (NO to the step S521), the accessory microcomputer 201 returns to the step S507.

If the voltage of the CHK_CMOS terminal is changed to the low level (YES to the step S507), the accessory microcomputer 201 determines whether or not the voltage of the SCLK_OK terminal is at the high level (step S508). Then, if the voltage of the SCLK_OK terminal is at the low level (NO to the step S508), the accessory microcomputer 201 proceeds to the step S523, described hereinafter.

If the voltage of the SCLK_OK terminal is at the high level (YES to the step S508), the accessory microcomputer 201 sets the voltage of the DO_A terminal to the low level (step S509). That is, the accessory microcomputer 201 sets the voltage of the connection terminal 203c (DI terminal) to VDI_2L (0 V) to thereby notify the camera body 100 of the busy state thereof.

Next, the accessory microcomputer 201 determines whether or not the accessory 200 is in the communicable state (step S510). If the accessory 200 is not in the communicable state (NO to the step S510), the accessory microcomputer 201 waits. On the other hand, if the accessory 200 is in the communicable state (YES to the step S510), the accessory microcomputer 201 sets the voltages of the SCLK_CMOS_ON terminal, the DO_CMOS_ON terminal, and the DI_CMOS_ON terminal to the high levels (step S511). The accessory microcomputer 201 thus sets the communication method of the communication interface section 202 to the second communication method.

Then, the accessory microcomputer 201 sets the voltage of the DO_A terminal to the high level (step S512). That is, the accessory microcomputer 201 sets the voltage of the connection terminal 203c (DI terminal) to VDI_2H to thereby notify the camera body 100 that the accessory microcomputer 201 has exited the busy state (at the time point T8 in FIG. 8), followed by terminating the interrupt process.

If it is determined in the step S502 that the DO_OK terminal is at the low level or the CHK_CMOS terminal is at the low level (NO to the step S502), the accessory microcomputer 201 determines that the communication method has not been normally switched to the second communication method, the interface of the camera has been powered off, or the camera has been disconnected. Then, the accessory microcomputer 201 sets the voltages of the SCLK_CMOS_ON terminal, the DO_CMOS_ON terminal, and the DI_CMOS_ON terminal to the low levels (step S523). The accessory microcomputer 201 thus sets the communication method of the communication interface section 202 to the first communication method.

Next, the accessory microcomputer 201 turns off the output of the connection terminal 203c (DI terminal) (step S524), followed by terminating the interrupt process.

As described above, in the first embodiment of the invention, it is possible to perform connection confirmation and switching to the second communication method in a manner preventing adverse influence from being exerted on an accessory device which is compatible only with the first communication method. Further, it is possible to switch to the second communication method in a short time period without performing communication by the first communication method.

Next, a description will be given of a camera as an electronic apparatus according to a second embodiment of the invention.

Figure 13:
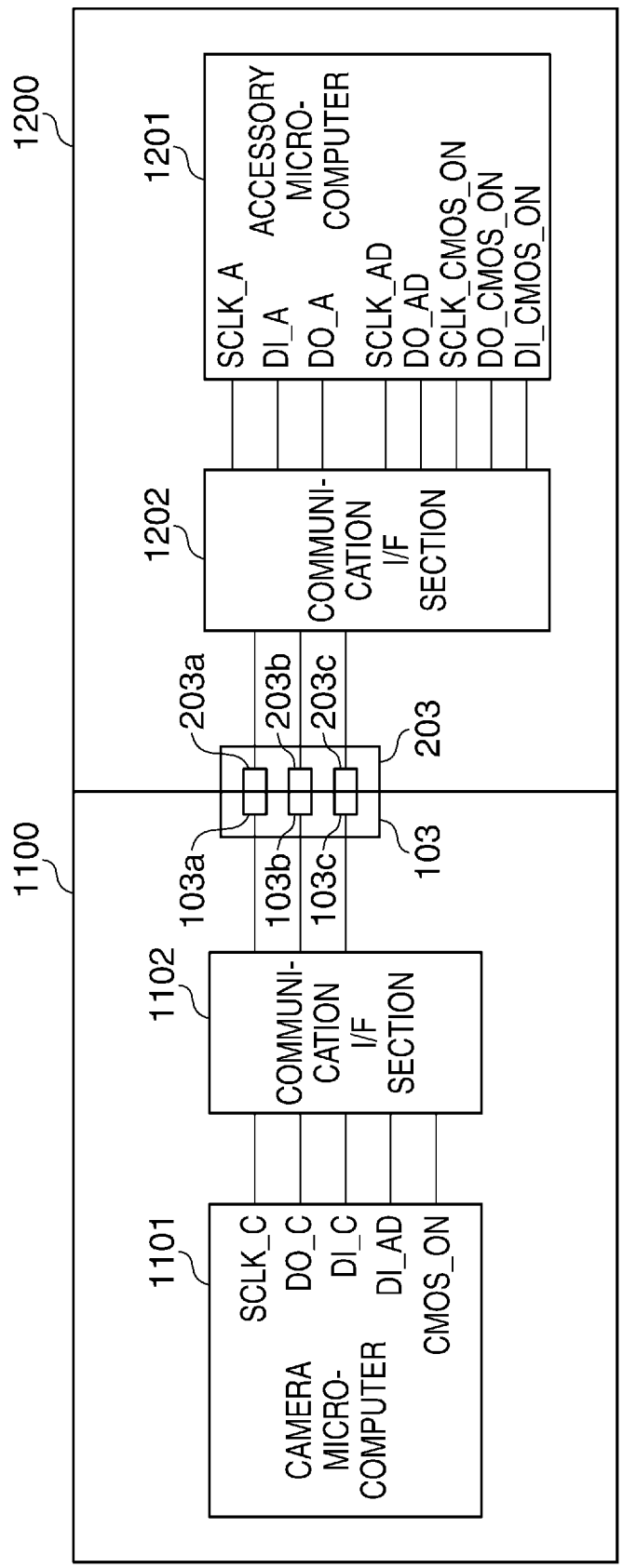
FIG. 13 is a block diagram showing a camera as an electronic apparatus according to a second embodiment of the invention together with an accessory.

FIG. 13 is a block diagram showing the camera as the electronic apparatus according to the second embodiment together with an accessory. In FIG. 13, the same components as those of the camera shown in FIG. 1 are denoted by the same reference numerals.

In the camera shown in FIG. 13, an accessory 1200, such as a lighting device (strobe device), is connected to a camera body 1100. The camera body 1100 is provided with a camera microcomputer 1101, and the camera microcomputer 1101 controls the overall operation of the camera body 1100 and communicates with the accessory 1200.

An interface (I/F) circuit 1102 is used for connecting the camera microcomputer 1101 and an accessory microcomputer 1201 provided in the accessory 1200 and is compatible with the first communication method and the second communication method. The camera body 1100 is connected to the accessory 1200 via the communication contact section 103.

The accessory microcomputer 1201 of the accessory 1200 controls the overall operation of the accessory 1200 and communicates with the camera microcomputer 1101. A communication interface (I/F) section 1202 is used for connecting the camera microcomputer 1101 and the accessory microcomputer 1201 and is compatible with the first and second communication methods. The accessory 1200 is connected to the camera body 1100 via the communication contact section 203.

Figure 14:
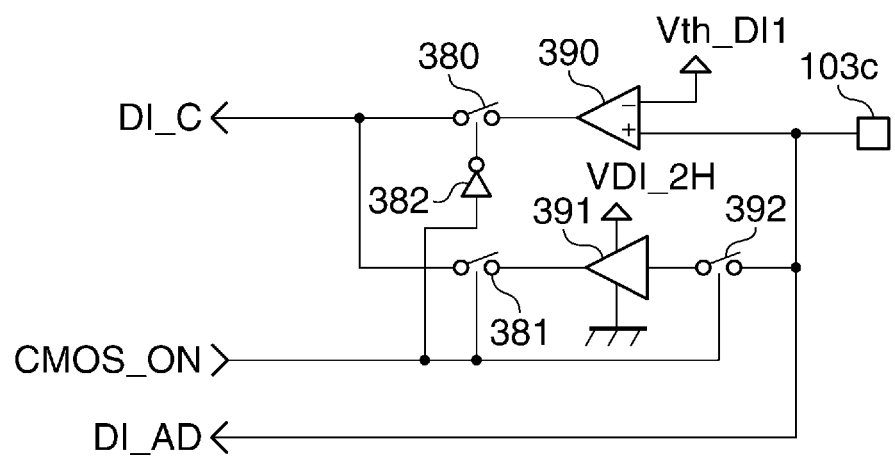
FIG. 14 is a diagram of an interface circuit provided in a communication interface section of a camera body appearing in FIG. 13, for communication data input from the accessory to the camera body.

FIG. 14 is a diagram of an interface circuit provided in the communication interface section 1102 of the camera body 1100 appearing in FIG. 13, for communication data input from the accessory 1200 to the camera body 1100.

In the interface circuit shown in FIG. 14, the same components as those of the interface circuit shown in FIG. 2C are denoted by the same reference numerals, and description thereof is omitted.

Further, in the communication interface section 1102, an interface circuit for a clock signal delivered from the camera body 1100 to the accessory 1200 is the same as the interface circuit shown in FIG. 2A. Further, in the communication interface section 1102, an interface circuit for communication data output from the camera body 1100 to the accessory 1200 is the same as the interface circuit shown in FIG. 2B.

In the interface circuit shown in FIG. 14, the comparator 393 appearing in FIG. 2C is not included, and the connection terminal 103c is directly connected to a DI_AD terminal (port) of the camera microcomputer 1101. The DI_AD terminal is an analog-to-digital conversion terminal of the camera microcomputer 1101.

Figure 15A:
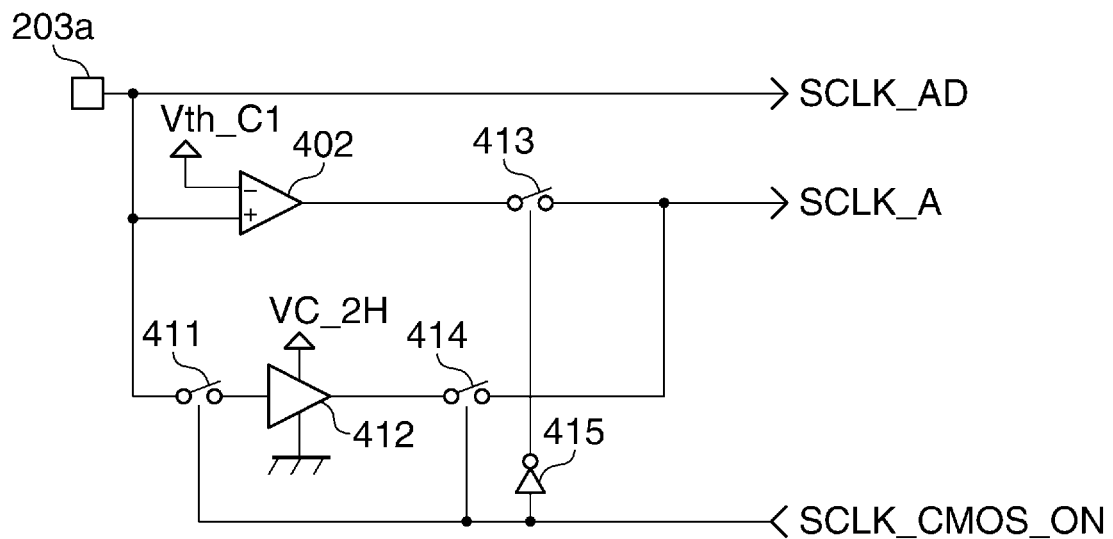
Figure 15B:
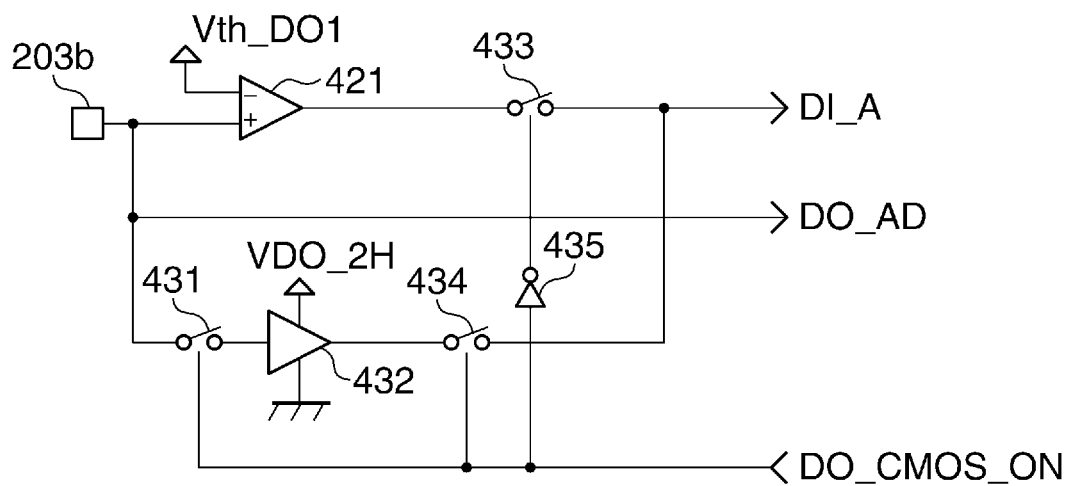

FIGS. 15A and 15B are diagrams useful in explaining the communication interface section 1202 provided in the accessory 1200 appearing in FIG. 13, in which FIG. 15A shows an interface circuit thereof for a clock signal delivered from the camera body 1100 to the accessory 1200, and FIG. 15B shows an interface circuit thereof for communication data output from the camera body 1100 to the accessory 1200.

In FIGS. 15A and 15B, the same components of the interface circuits as those of the interface circuits shown in FIGS. 3A and 3B are denoted by the same reference numerals, and description thereof is omitted. Further, in the communication interface section 1202, an interface circuit for communication data input from the accessory 1200 to the camera body 1100 is the same as the interface circuit shown in FIG. 3C.

In the interface circuit shown in FIG. 15A, the comparators 401 and 403 appearing in FIG. 3A are not included, and the connection terminal 203a is directly connected to a SCLK_AD terminal (port) of the accessory microcomputer 1201. The SCLK_AD terminal is an analog-to-digital conversion terminal of the accessory microcomputer 1201.

In the interface circuit shown in FIG. 15B, the comparator 422 appearing in FIG. 3B is not included, and the connection terminal 203a is directly connected to a DO_AD terminal (port) of the accessory microcomputer 1201. The DO_AD terminal is an analog-to-digital conversion terminal of the accessory microcomputer 1201.

Note that in the camera shown in FIG. 13, states of the communication terminals (connection terminals) in the first communication method are the same as in the example described with reference to the timing diagram shown in FIG. 5. Further, in the camera shown in FIG. 13, states of the communication terminals (connection terminals) in the second communication method are the same as in the example described with reference to the timing diagram shown in FIG. 6. Further, in the camera shown in FIG. 13, a state of each communication terminal when confirming connection of the communication terminals (connection terminals) and shifting the communication method to the second communication method is the same as in the example described with reference to the timing diagram shown in FIG. 6.

Figure 16:
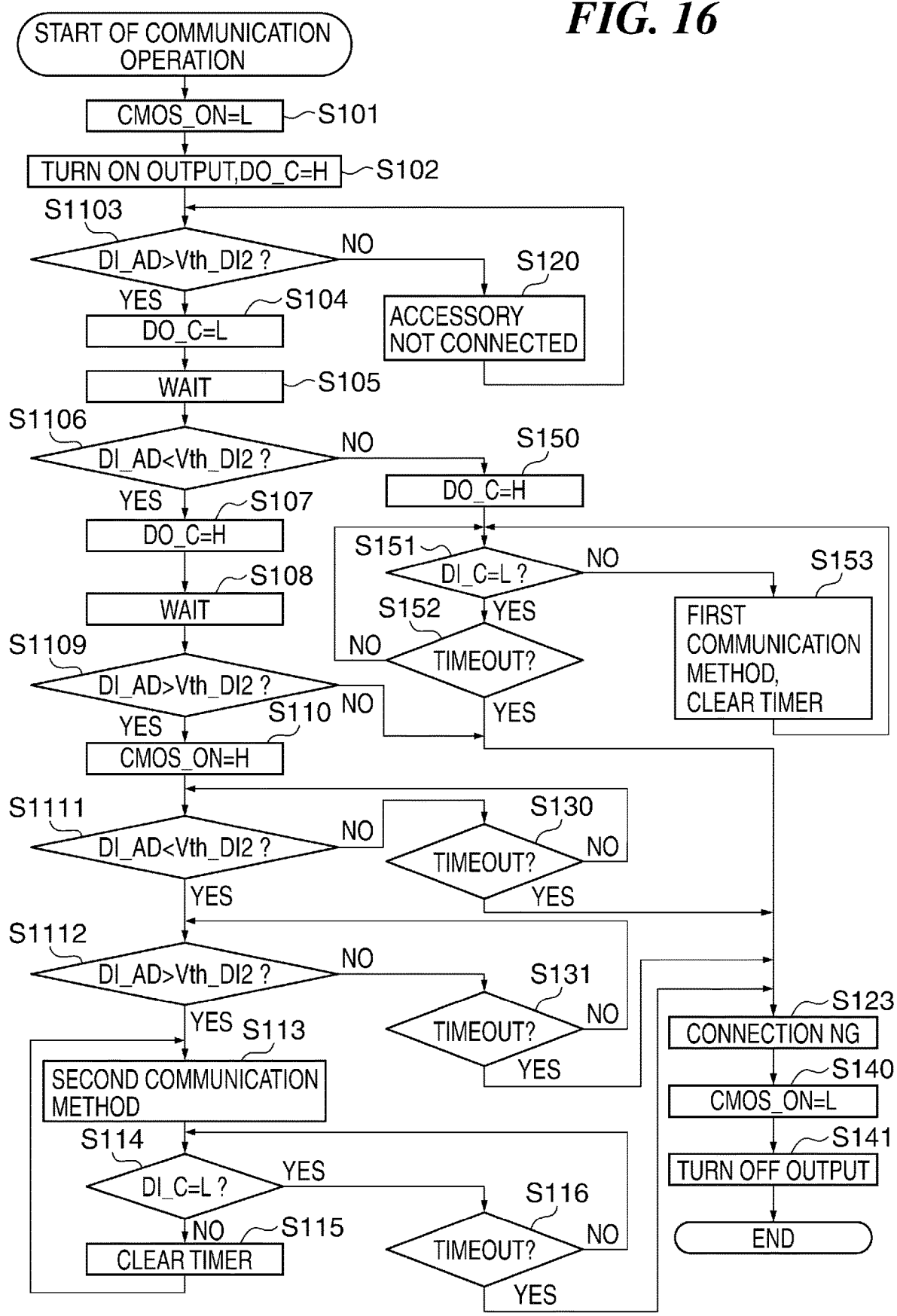
FIG. 16 is a flowchart of a process for controlling a communication operation of a camera microcomputer appearing in FIG. 13.

FIG. 16 is a flowchart of a process for controlling a communication operation of the camera microcomputer 1101 appearing in FIG. 13. The same steps of the process in FIG. 16 as those of the process in FIG. 7 are denoted by the same step numbers, and description thereof is omitted.

After executing the step S102, described with reference to FIG. 7, the camera microcomputer 1101 determines whether or not the voltage of the connection terminal 103c (DI terminal) is higher than the connection confirmation voltage Vth_DI2. Here, the camera microcomputer 1101 determines whether or not the AD conversion output (DI_AD) of the DI_AD terminal is higher than the level corresponding to the connection confirmation voltage Vth_DI2 (step S1103).

If DI_AD>Vth_DI2 holds (YES to the step S1103), the camera microcomputer 1101 proceeds to the step S104. On the other hand, if DI_AD≤Vth_DI2 holds (NO to the step S1103), the camera microcomputer 1101 proceeds to the step S120. Then, after executing the step S120, the camera microcomputer 1101 returns to the step S1103.

Further, after executing the step S105, described with reference to FIG. 7, the camera microcomputer 1101 determines whether or not the AD conversion output of the DI_AD terminal is lower than the level corresponding to the connection confirmation voltage Vth_DI2 (step S1106).

If DI_AD<Vth_DI2 holds (YES to the step S1106), the camera microcomputer 1101 proceeds to the step S107. On the other hand, if DI_AD≥Vth_DI2 holds (NO to the step S1106), the camera microcomputer 1101 proceeds to the step S150.

Further, after executing the step S108, described with reference to FIG. 7, the camera microcomputer 1101 determines whether or not the AD conversion output of the DI_AD terminal is higher than the level corresponding to the connection confirmation voltage Vth_DI2 (step S1109).

If DI_AD>Vth_DI2 holds (YES to the step S1109), the camera microcomputer 1101 proceeds to the step S110. On the other hand, if DI_AD≤Vth_DI2 holds (NO to the step S1109), the camera microcomputer 1101 proceeds to the step S123.

After executing the step S110, the camera microcomputer 1101 determines whether or not the AD conversion output of the DI_AD terminal is lower than the level corresponding to the connection confirmation voltage Vth_DI2 (step S1111).

If DI_AD<Vth_DI2 holds (YES to the step S1111), the camera microcomputer 1101 determines whether or not the AD conversion output of the DI_AD terminal is higher than the level corresponding to the connection confirmation voltage Vth_DI2 (step S1112). Then, if DI_AD>Vth_DI2 holds (YES to the step S1112), the camera microcomputer 1101 proceeds to the step S113.

On the other hand, if DI_AD≤Vth_DI2 holds (NO to the step S1112), the camera microcomputer 1101 proceeds to the step S131. Then, if the timeout period has not elapsed in the step S131, the camera microcomputer 1101 returns to the step S1112.

If DI_AD≥Vth_DI2 holds in the step S1111 (NO to the step S1111), the camera microcomputer 1101 proceeds to the step S130. Then, if the timeout period has not elapsed in the step S130, the camera microcomputer 1101 returns to the step S1112.

Figure 17:
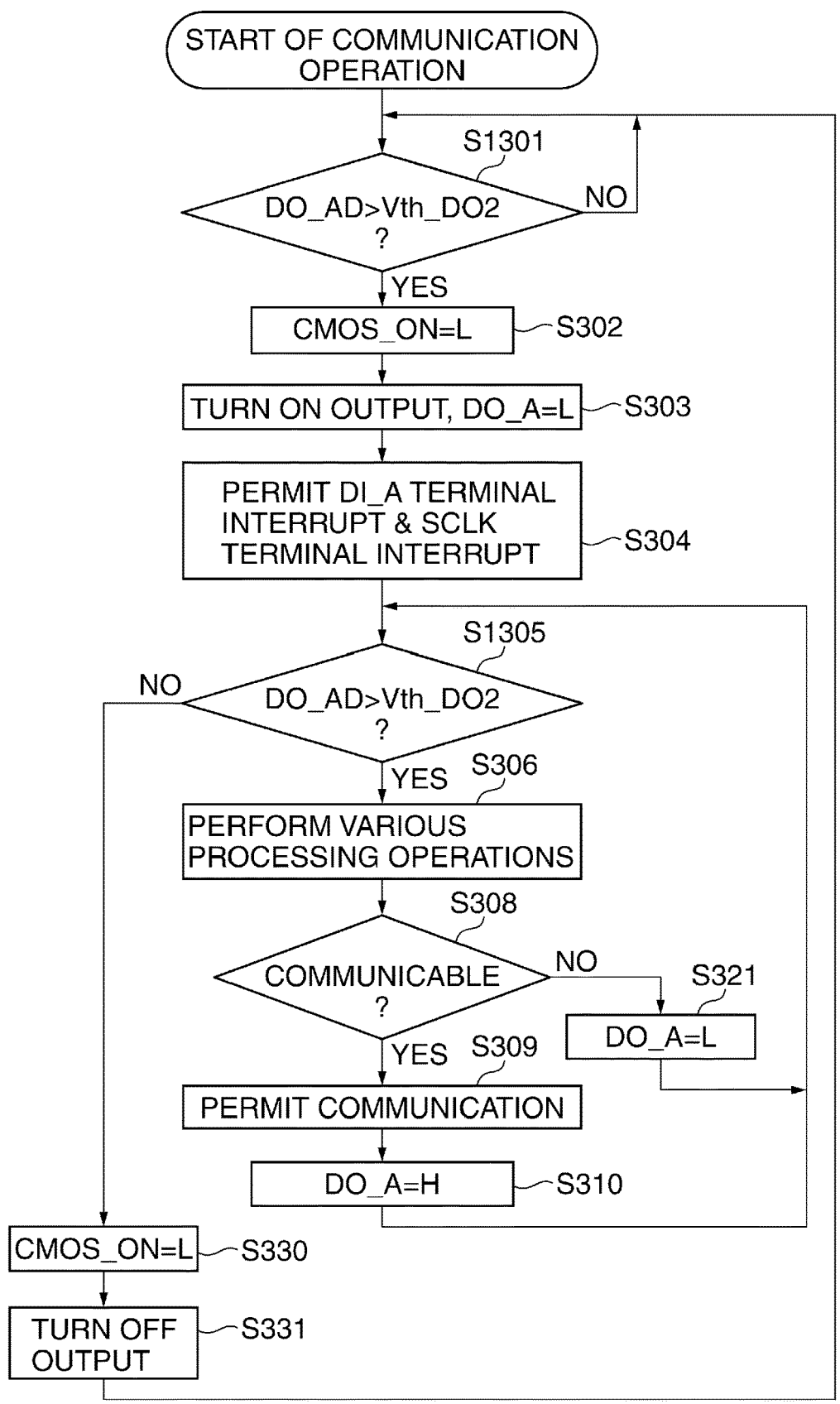
FIG. 17 is a flowchart of a process for controlling a communication operation of an accessory microcomputer appearing in FIG. 13.

FIG. 17 is a flowchart of a process for controlling a communication operation of the accessory microcomputer 1201 appearing in FIG. 13. The same steps of the process in FIG. 17 as those of the process in FIG. 10 are denoted by the same step numbers, and description thereof is omitted.

After starting the communication operation, the accessory microcomputer 1201 determines whether or not the voltage of the connection terminal 203b (DO terminal) is higher than the connection confirmation voltage Vth_DO2. Here, the accessory microcomputer 1201 determines whether or not the AD conversion output (DO_AD) of the DO_AD terminal is higher than a level corresponding to the connection confirmation voltage Vth_DO2 (step S1301).

If DO_AD≤Vth_DO2 holds (NO to the step S1301), the accessory microcomputer 1201 waits. On the other hand, if DO_AD>Vth_DO2 holds (YES to the step S1301), the accessory microcomputer 1201 proceeds to the step S302, described with reference to FIG. 10.

After executing the step S304, described with reference to FIG. 10, the accessory microcomputer 1201 determines whether or not the AD conversion output of the DO_AD terminal is higher than the level corresponding to the connection confirmation voltage Vth_DO2 (step S1305). If DO_AD≤Vth_DO2 holds (NO to the step S1305), the accessory microcomputer 1201 proceeds to the step S330. On the other hand, if DO_AD>Vth_DO2 holds (YES to the step S1305), the accessory microcomputer 1201 proceeds to the step S306.

Now, interrupt processes performed by the accessory microcomputer 1201 will be described. Note that the SCLK_A terminal interrupt process performed by the accessory microcomputer 1201 is the same as the SCLK_A terminal interrupt process described with reference to FIG. 11.

Figure 18:
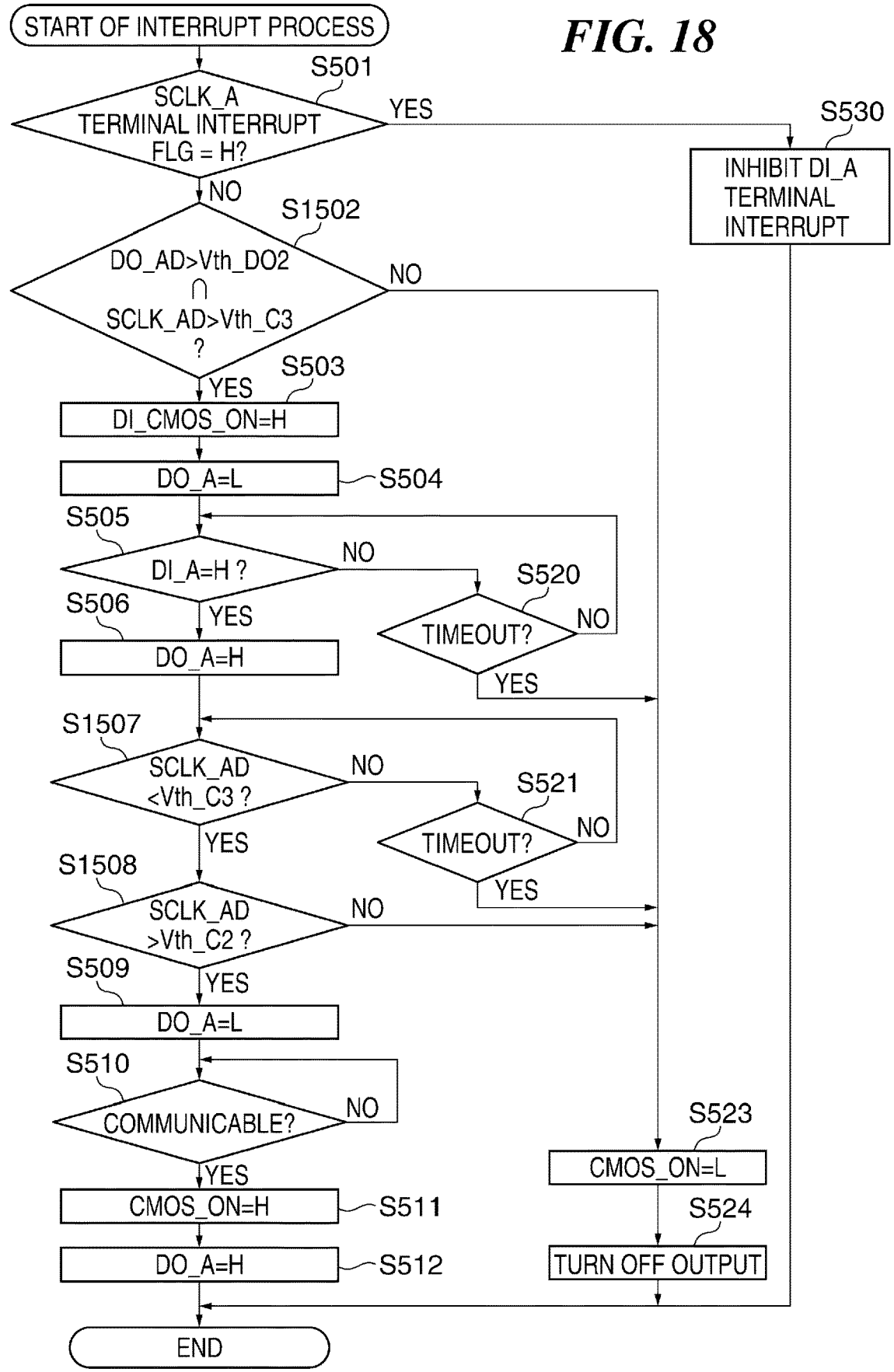
FIG. 18 is a flowchart of a DI_A terminal interrupt process performed by the accessory microcomputer appearing in FIG. 13.

FIG. 18 is a flowchart of a DI_A terminal interrupt process performed by the accessory microcomputer 1201 appearing in FIG. 13. The same steps of the process in FIG. 18 as those of the process in FIG. 12 are denoted by the same step numbers, and description thereof is omitted.

If it is determined in the step S501, described with reference to FIG. 12, that SCLK_A terminal interrupt FLG=H does not hold, the accessory microcomputer 1201 determines whether or not the voltage of the connection terminal 203b (DO terminal) is higher than the connection confirmation voltage Vth_DO2. Here, the accessory microcomputer 1201 determines whether or not the AD conversion output level of the DO_AD terminal is higher than the level corresponding to the connection confirmation voltage Vth_DO2, and also the AD conversion output level of the SCLK_AD terminal (SCLK_AD) is higher than the threshold value Vth_C3 (step S1502).

If the AD conversion output level of the DO_AD terminal is not higher than the level corresponding to the connection confirmation voltage Vth_DO2 or the AD conversion output level of the SCLK_AD terminal is not higher than the threshold value Vth_C3 (NO to the step S1502), the accessory microcomputer 1201 proceeds to the step S523, described with reference to FIG. 12. On the other hand, if the AD conversion output level of the DO_AD terminal is higher than the level corresponding to the connection confirmation voltage Vth_DO2 and also the AD conversion output level of the SCLK_AD terminal is higher than the threshold value Vth_C3 (YES to the step S1502), the accessory microcomputer 1201 proceeds to the step S503.

After executing the step S506, described with reference to FIG. 12, the accessory microcomputer 1201 determines whether or not the AD conversion output level of the SCLK_AD terminal (SCLK_AD) is lower than the threshold value Vth_C3 (step S1507). That is, the accessory microcomputer 1201 determines whether or not the voltage of the connection terminal 203a (SCLK terminal) has become the high level VC_2H (at the time point T6 in FIG. 8).

If SCLK_AD≥Vth_C3 holds (NO to the step S1507), the accessory microcomputer 1201 proceeds to the step S521. Then, if the timeout period has not elapsed in the step S521, the accessory microcomputer 1201 returns to the step S1507.

If SCLK_AD<Vth_C3 holds (YES to the step S1507), the accessory microcomputer 1201 determines whether or not AD conversion output level of the SCLK_AD terminal (SCLK_AD) is higher than the threshold value Vth_C2 (step S1508).

If SCLK_AD≤Vth_C2 holds (NO to the step S1508), the accessory microcomputer 1201 proceeds to the step S523. On the other hand, if SCLK_AD>Vth_C2 holds (YES to the step S1508), the accessory microcomputer 1201 proceeds to the step S509.

As described above, in the second embodiment of the invention, when determining the voltage level, the AD conversion terminals provided in the camera microcomputer 1101 and the accessory microcomputer 1201 are used. This makes it possible to simplify the circuit configurations of the communication interface sections 1102 and 1202.

Further, also in the second embodiment, similarly to the first embodiment, it is possible to perform connection confirmation and switching to the second communication method (second communication mode) in a manner preventing adverse influence from being exerted on an accessory device which is compatible only with the first communication method (first communication mode). Further, it is possible to switch to the second communication method in a short time period without performing communication by the first communication method.

Although in the above-described embodiments, the camera has been described as an example of the electronic apparatus, the invention can be applied to any other electronic apparatus insofar as it is an electronic apparatus which connects an accessory device to an electronic apparatus body thereof. Further, although a lighting device has been described as an example of the accessory device, the invention can be similarly applied to any other accessory device, such as a display device and a communication device, insofar as it is an accessory device which is connected to the electronic apparatus body.

As is clear from the above description, in the example shown in FIG. 1, the camera microcomputer 101 and the communication interface section 102 function as a level changing unit and a detection unit. Further, the camera microcomputer 101 and the communication interface section 102 function as a first transmission unit, a second transmission unit, and a reception unit. Further, the camera microcomputer 101 and the communication interface section 102 function as a first notification unit and a first determination unit.

The accessory microcomputer 201 and the communication interface section 202 function as a second notification unit, a second determination unit, and an informing unit. Further, the camera microcomputer 101 and the accessory microcomputer 202 function as a first setting unit and a second setting unit, respectively.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-260285 filed Dec. 24, 2014, which is hereby incorporated by reference herein in its entirety.

What is claimed is:

1. A lighting device that is capable of connecting to an electronic apparatus, and performs communication between the lighting device and the electronic apparatus connected thereto, the lighting device comprising:
  a communication contact section having a first terminal, a second terminal that receives a signal from the electronic apparatus, and a third terminal that outputs a signal from the lighting device to the electronic apparatus, each of the first terminal, the second terminal, and the third terminal being connectable to the electronic apparatus; and
  a communication control unit in the lighting device configured to change a voltage level of the third terminal in order to notify the electronic apparatus that it is possible to perform communication in a predetermined communication mode, when a voltage level of the first terminal of the lighting device is at a high level and the signal from the electronic apparatus causes a predetermined change of a voltage level of the second terminal of the lighting device.

2. The lighting device according to claim 1, wherein the communication control unit switches the voltage level of the third terminal between a high level and a low level, the high level being used for the communication performed in the predetermined communication mode in order to notify the electronic apparatus that it is possible to perform the communication in the predetermined communication mode.

3. The lighting device according to claim 1, wherein the communication control unit changes the voltage level of the third terminal in order to notify the electronic apparatus that it is possible to perform the communication in the predetermined communication mode, and thereafter performs the communication in the predetermined communication mode.

4. The lighting device according to claim 1, wherein the communication control unit changes the voltage level of the third terminal in order to notify the electronic apparatus that it is possible to perform the communication in the predetermined communication mode when the voltage level of the first terminal is kept at the high level while the signal from the electronic apparatus causes the voltage level of the second terminal to change from the high level to the low level and thereafter to change from the low level to the high level.

5. A method of controlling a lighting device that is connectable to an electronic apparatus, can perform communication with the electronic apparatus when connected thereto, and includes a first terminal, a second terminal that receives a signal from the electronic apparatus, and a third terminal that outputs a signal from the lighting device to the electronic apparatus, each of the first terminal, the second terminal, and the third terminal being connectable to the electronic apparatus, the method comprising:

changing by the lighting device, when a voltage level of the first terminal of the lighting device is at a high level and the signal from the electronic apparatus causes a predetermined change of a voltage level of the second terminal of the lighting device, a voltage level of the third terminal in order to notify the electronic apparatus that it is possible to perform communication in a predetermined communication mode.

6. The lighting device according to claim 1, wherein the predetermined change of the voltage level of the second terminal includes switching the voltage level of the second terminal between a high level and a low level which is not 0.

* * * * *